US008626146B2

(12) United States Patent
Koganti et al.

(10) Patent No.: US 8,626,146 B2
(45) Date of Patent: *Jan. 7, 2014

(54) METHOD, SOFTWARE AND APPARATUS FOR PERFORMING ACTIONS ON A WIRELESS DEVICE USING ACTION LISTS AND VERSIONING

(75) Inventors: Sudheer B. Koganti, San Diego, CA (US); Stephen A. Sprigg, Poway, CA (US); Amy Suzanne Therrell, San Diego, CA (US); Brian Minear, San Diego, CA (US); Phil Tien Nguyen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/975,973

(22) Filed: Oct. 27, 2004

(65) Prior Publication Data

US 2005/0118991 A1    Jun. 2, 2005

Related U.S. Application Data

(60) Provisional application No. 60/515,823, filed on Oct. 29, 2003.

(51) Int. Cl.
*H04M 3/00* (2006.01)
*G06F 9/44* (2006.01)

(52) U.S. Cl.
USPC ........... 455/419; 455/418; 455/420; 717/168; 717/172

(58) Field of Classification Search
USPC .......... 455/419, 418, 420, 560, 517; 717/168, 717/172
See application file for complete search history.

(56) References Cited

U.S. PATENT DOCUMENTS

| 5,155,847 | A | 10/1992 | Kirouac et al. |
| 5,473,772 | A | 12/1995 | Halliwell et al. |
| 5,564,051 | A | 10/1996 | Halliwell et al. |
| 5,612,682 | A | 3/1997 | DeLuca et al. |

(Continued)

FOREIGN PATENT DOCUMENTS

| CN | 1288199 | 3/2001 |
| DE | 19543843 | 5/1997 |

(Continued)

OTHER PUBLICATIONS

International Search Report—PCT/US04/036104, International Searching Authority—US, Feb. 16, 2005.

(Continued)

*Primary Examiner* — Brandon Miller
(74) *Attorney, Agent, or Firm* — Fariba Yadegar-Bandari

(57) ABSTRACT

A system and method for performing actions on a wireless device using action lists and versioning. The system includes receiving, over a network, a remote action list version number, the remote action list version number associated with a remote action list containing an instruction for the wireless device. The system further includes determining whether the remote action list version number is different from a local action list version number. The system also includes sending, over a network, a request for the remote action list in response to determining the remote action list version number is different from the local action list version number. Also, the system includes receiving, over a network, the remote action list.

33 Claims, 9 Drawing Sheets

(56) References Cited

U.S. PATENT DOCUMENTS

| | | | |
|---|---|---|---|
| 5,761,618 A | 6/1998 | Lynch et al. | |
| 5,848,064 A | 12/1998 | Cowan | |
| 5,920,821 A | 7/1999 | Seazholtz et al. | |
| 5,995,756 A | 11/1999 | Herrmann | |
| 6,006,034 A * | 12/1999 | Heath et al. | 717/170 |
| 6,009,274 A | 12/1999 | Fletcher et al. | |
| 6,023,620 A | 2/2000 | Hansson | |
| 6,031,830 A * | 2/2000 | Cowan | 370/338 |
| 6,074,434 A | 6/2000 | Cole et al. | |
| 6,128,489 A | 10/2000 | Seazholtz et al. | |
| 6,167,567 A | 12/2000 | Chiles et al. | |
| 6,199,204 B1 | 3/2001 | Donohue | |
| 6,272,333 B1 | 8/2001 | Smith | |
| 6,272,677 B1 | 8/2001 | Lam et al. | |
| 6,308,061 B1 * | 10/2001 | Criss et al. | 455/418 |
| 6,314,565 B1 | 11/2001 | Kenner et al. | |
| 6,327,617 B1 | 12/2001 | Fawcett | |
| 6,360,366 B1 | 3/2002 | Heath et al. | |
| 6,389,423 B1 | 5/2002 | Sakakura | |
| 6,397,060 B1 | 5/2002 | Oikawa | |
| 6,418,554 B1 | 7/2002 | Delo et al. | |
| 6,564,048 B1 | 5/2003 | Sugita | |
| 6,636,872 B1 | 10/2003 | Heath et al. | |
| 6,643,506 B1 | 11/2003 | Criss et al. | |
| 6,687,901 B1 * | 2/2004 | Imamatsu | 717/173 |
| 6,735,625 B1 | 5/2004 | Ponna | |
| 6,735,766 B1 | 5/2004 | Chamberlain et al. | |
| 6,748,209 B2 | 6/2004 | Lipsit | |
| 6,754,894 B1 | 6/2004 | Costello et al. | |
| 6,789,255 B1 | 9/2004 | Pedrizetti et al. | |
| 6,807,415 B2 * | 10/2004 | Sato | 455/420 |
| 6,832,373 B2 | 12/2004 | O'neill | |
| 6,868,455 B1 | 3/2005 | Ariyama | |
| 6,877,037 B1 | 4/2005 | Adachi | |
| 6,909,898 B2 | 6/2005 | Mielke et al. | |
| 6,961,764 B2 * | 11/2005 | Mizoguchi | 709/223 |
| 6,970,960 B1 | 11/2005 | Sarfati | |
| 7,127,712 B1 | 10/2006 | Noble et al. | |
| 7,140,013 B2 | 11/2006 | TE'eni et al. | |
| 7,149,508 B2 * | 12/2006 | Herle | 455/418 |
| 7,149,792 B1 | 12/2006 | Hansen et al. | |
| 7,194,258 B2 * | 3/2007 | Okita et al. | 455/418 |
| 7,555,750 B1 | 6/2009 | Lilley | |
| 7,669,197 B1 | 2/2010 | O'neill et al. | |
| 2001/0029178 A1 | 10/2001 | Criss et al. | |
| 2001/0029605 A1 | 10/2001 | Forbes et al. | |
| 2001/0052052 A1 | 12/2001 | Peng | |
| 2001/0053688 A1 | 12/2001 | Rignell et al. | |
| 2002/0016956 A1 | 2/2002 | Fawcett | |
| 2002/0077094 A1 * | 6/2002 | Leppanen | 455/420 |
| 2002/0078209 A1 | 6/2002 | Peng | |
| 2002/0091799 A1 | 7/2002 | Katz et al. | |
| 2002/0100035 A1 | 7/2002 | Kenyon et al. | |
| 2002/0131404 A1 | 9/2002 | Mehta et al. | |
| 2002/0157090 A1 * | 10/2002 | Anton, Jr. | 717/178 |
| 2002/0177437 A1 | 11/2002 | Chesavage et al. | |
| 2002/0178178 A1 | 11/2002 | Peng | |
| 2003/0023516 A1 | 1/2003 | Sharrow et al. | |
| 2003/0046676 A1 | 3/2003 | Cheng et al. | |
| 2003/0078036 A1 * | 4/2003 | Chang et al. | 455/419 |
| 2003/0100297 A1 | 5/2003 | Riordan et al. | |
| 2003/0105847 A1 | 6/2003 | Jennery et al. | |
| 2003/0124974 A1 | 7/2003 | Asami | |
| 2003/0143991 A1 | 7/2003 | Minear et al. | |
| 2004/0003389 A1 | 1/2004 | Reynar et al. | |
| 2004/0015953 A1 | 1/2004 | Vincent | |
| 2004/0038675 A1 | 2/2004 | Criss et al. | 455/419 |
| 2004/0068724 A1 | 4/2004 | Gardner, III | |
| 2004/0107417 A1 | 6/2004 | Chia et al. | |
| 2004/0117785 A1 | 6/2004 | Kincaid | |
| 2004/0158817 A1 | 8/2004 | Okachi et al. | |
| 2004/0188510 A1 | 9/2004 | Sprigg et al. | |
| 2004/0188511 A1 | 9/2004 | Sprigg et al. | |
| 2004/0224674 A1 * | 11/2004 | O'Farrell et al. | 455/418 |

FOREIGN PATENT DOCUMENTS

| | | |
|---|---|---|
| EP | 0841615 A2 | 5/1998 |
| EP | 0959635 | 11/1999 |
| GB | 2348721 A | 10/2000 |
| JP | 1198477 | 8/1989 |
| JP | 5210507 A | 8/1993 |
| JP | 08106393 | 4/1996 |
| JP | 9292980 A | 11/1997 |
| JP | 10021061 A | 1/1998 |
| JP | 10049354 A | 2/1998 |
| JP | 11110197 A | 4/1999 |
| JP | 11225359 A | 8/1999 |
| JP | H11331937 A | 11/1999 |
| JP | 11-514760 | 12/1999 |
| JP | 2000132355 | 5/2000 |
| JP | 2000132397 A | 5/2000 |
| JP | 2000276335 A | 10/2000 |
| JP | 2001043073 A | 2/2001 |
| JP | 2001053882 A | 2/2001 |
| JP | 2001101219 A | 4/2001 |
| JP | 2001251380 A | 9/2001 |
| JP | 2001256053 A | 9/2001 |
| JP | 2001296994 A | 10/2001 |
| JP | 2001337832 A | 12/2001 |
| JP | 2001356912 A | 12/2001 |
| JP | 2002215692 A | 8/2002 |
| JP | 2002-278767 | 9/2002 |
| KR | 19990057991 | 7/1999 |
| KR | 20020009741 | 2/2002 |
| KR | 20030030044 A | 4/2003 |
| KR | 20030033396 A | 5/2003 |
| KR | 20040069963 | 8/2004 |
| TW | 361057 | 6/1999 |
| TW | 448404 B | 8/2001 |
| TW | 473660 B | 1/2002 |
| TW | 503368 B | 9/2002 |
| WO | WO9102313 A1 | 2/1991 |
| WO | WO9729606 A1 | 8/1997 |
| WO | WO9838820 A2 | 9/1998 |
| WO | WO9945465 | 9/1999 |
| WO | WO0077614 | 12/2000 |
| WO | WO0169888 A1 | 9/2001 |
| WO | WO0193030 A1 | 12/2001 |
| WO | WO0246914 | 6/2002 |
| WO | WO02075525 | 9/2002 |

OTHER PUBLICATIONS

Written Opinion—PCT/US04/036104, International Searching Authority—US, Feb. 16, 2005.

International Preliminary Report on Patentability—PCT/US04/036104—IPEA/US, Aug. 16, 2005.

Supplementary European Search Report—EP04796815, Search Authority—Munich Patent Office, May 4, 2007.

Advisory Action mailed Dec. 4, 2006, for U.S. Appl. No. 10/975,973, filed Oct. 27, 2004.

Advisory Action mailed Jan. 22, 2010, for U.S. Appl. No. 10/740,355, filed Dec. 18, 2003.

Advisory Action mailed Jul. 17, 2008, for U.S. Appl. No. 10/740,355, filed Dec. 18, 2003.

Advisory Action mailed Mar. 19, 2009, for U.S. Appl. No. 10/975,973, filed Oct. 27, 2004.

Advisory Action mailed Sep. 10, 2007, for U.S. Appl. No. 10/975,973, filed Oct. 27, 2004.

Appeal Brief mailed Dec. 9, 2008, for U.S. Appl. No. 10/061,875, filed Jan. 31, 2002.

Appeal Brief mailed Mar. 25, 2010, for U.S. Appl. No. 10/740,355, filed Dec. 18, 2003.

Final Office Action mailed Dec. 17, 2007, for U.S. Appl. No. 10/740,355, filed Dec. 18, 2003.

Final Office Action mailed Dec. 18, 2008, for U.S. Appl. No. 10/975,973, filed Oct. 27, 2004.

Final Office Action mailed Dec. 24, 2009, for U.S. Appl. No. 10/975,973, filed Oct. 27, 2004.

Final Office Action mailed Jul. 22, 2008, for U.S. Appl. No. 10/061,875, filed Jan. 31, 2002.

(56) References Cited

OTHER PUBLICATIONS

Final Office Action mailed Jul. 23, 2009, for U.S. Appl. No. 10/740,355, filed Dec. 18, 2003.
Final Office Action mailed Jun. 27, 2007, for U.S. Appl. No. 10/975,973, filed Oct. 27, 2004.
Final Office Action mailed Mar. 9, 2007, for U.S. Appl. No. 10/061,875, filed Jan. 31, 2002.
Final Office Action mailed May 18, 2004, for U.S. Appl. No. 10/061,875, filed Jan. 31, 2002.
Final Office Action mailed Nov. 2, 2005, for U.S. Appl. No. 10/061,875, filed Jan. 31, 2002.
Final Office Action mailed Oct 6, 2006, for U.S. Appl. No. 10/975,973, filed Oct. 27, 2004.
Non-Final Office Action mailed Apr. 7, 2010, for U.S. Appl. No. 10/975,973, filed Oct. 27, 2004
Non-Final Office Action mailed Jan. 26, 2005, for U.S. Appl. No. 10/061,875, filed Jan. 31, 2002.
Non-Final Office Action mailed Jan. 29, 2007, for U.S. Appl. No. 10/975,973, filed Oct. 27, 2004.
Non-Final Office Action mailed Jul. 7, 2003, for U.S. Appl. No. 10/061,875, filed Jan. 31, 2002.
Non-Final Office Action mailed Jul. 26, 2007, for U.S. Appl. No. 10/061,875, filed Jan. 31, 2002.
Non-Final Office Action mailed Jun. 12, 2008, for U.S. Appl. No. 10/975,973, filed Oct. 27, 2004.
Non-Final Office Action mailed Mar. 3, 2008, for U.S. Appl. No. 10/061,875, filed Jan. 31, 2002.
Non-Final Office Action mailed May 1, 2006, for U.S. Appl. No. 10/975,973, filed Oct. 27, 2004.
Non-Final Office Action mailed May 28, 2009, for U.S. Appl. No. 10/975,973, filed Oct. 27, 2004.
Non-Final Office Action mailed Nov. 28, 2007, for U.S. Appl. No. 10/975,973, filed Oct. 27, 2004.
Non-Final Office Action mailed Oct. 31, 2006, for U.S. Appl. No. 10/061,875, filed Jan. 31, 2002.
Response to Final Office Action mailed Apr. 17, 2008, for U.S. Appl. No. 10/740,355, filed Dec. 18, 2003.
Response to Final Office Action mailed Aug. 26, 2007, for U.S. Appl. No. 10/975,973, filed Oct. 27, 2004.
Response to Final Office Action mailed Aug. 29, 2007, for U.S. Appl. No. 10/975,973, filed Oct. 27, 2004.
Response to Final Office Action mailed Dec. 4, 2006, for U.S. Appl. No. 10/975,973, filed Oct. 27, 2004.
Response to Final Office Action mailed Dec. 27, 2005, for U.S. Appl. No. 10/061,875, filed Jan. 31, 2002.
Response to Final Office Action mailed Feb. 18, 2009, for U.S. Appl. No. 10/975,973, filed Oct. 27, 2004.
Response to Final Office Action mailed Jan. 22, 2010, for U.S. Appl. No. 10/740,355, filed Dec. 18, 2003.
Response to Final Office Action mailed Mar. 16, 2010, for U.S. Appl. No. 10/975,973, filed Oct. 27, 2004.
Response to Final Office Action mailed Mar. 30, 2006, for U.S. Appl. No. 10/061,875, filed Jan. 31, 2002.
Response to Final Office Action mailed May 9, 2007, for U.S. Appl. No. 10/061,875, filed Jan. 31, 2002.
Response to Final Office Action mailed Nov. 21, 2006, for U.S. Appl. No. 10/975,973, filed Oct. 27, 2004.
Response to Final Office Action mailed Sep. 20, 2004, for U.S. Appl. No. 10/061,875, filed Jan. 31, 2002.
Response to Final Office Action mailed Sep. 22, 2008, for U.S. Appl. No. 10/061,875, filed Jan. 31, 2002.
Response to Final Office Action mailed Sep. 23, 2009, for U.S. Appl. No. 10/740,355, filed Dec. 18, 2003.
Response to Non-Final Office Action mailed Apr. 22, 2007, for U.S. Appl. No. 10/975,973, filed Oct. 27, 2004.
Response to Non-Final Office Action mailed Apr. 28, 2005, for U.S. Appl. No. 10/061,875, filed Jan. 31, 2002.
Response to Non-Final Office Action mailed Aug. 23, 2006, for U.S. Appl. No. 10/975,973, filed Oct. 27, 2004.
Response to Non-Final Office Action mailed Aug. 30, 2009, for U.S. Appl. No. 10/975,973, filed Oct. 27, 2004.
Response to Non-Final Office Action mailed Dec. 23, 2007, for U.S. Appl. No. 10/061,875, filed Jan. 31, 2002.
Response to Non-Final Office Action mailed Jan. 9, 2004, for U.S. Appl. No. 10/061,875, filed Jan. 31, 2002.
Response to Non-Final Office Action mailed Jan. 31, 2007, for U.S. Appl. No. 10/061,875, filed Jan. 31, 2002.
Response to Non-Final Office Action mailed Mar. 4, 2008, for U.S. Appl. No. 10/975,973, filed Oct. 27, 2004.
Response to Non-Final Office Action mailed Mar. 24, 2009, for U.S. Appl. No. 10/740,355, filed Dec. 18, 2003.
Response to Non-Final Office Action mailed May 26, 2008, for U.S. Appl. No. 10/061,875, filed Jan. 31, 2002.
Response to Non-Final Office Action mailed Sep. 17, 2008, for U.S. Appl. No. 10/975,973, filed Oct. 27, 2004.
Taiwan Search Report-TW093133076-TIPO-Jul. 28, 2011.
Dolgolaptev, V.G., "Rabota v Windows 95 na primerakh", (Operation in Windows 95 by Examples)—Moscow, Vostochnaya Knizhnaya Kompania (East Book Company), published on 1997, 464 pp.

\* cited by examiner

METHOD, SOFTWARE AND APPARATUS FOR PERFORMING ACTIONS ON A WIRELESS DEVICE USING ACTION LISTS AND VERSIONING

RELATED APPLICATIONS

This application claims priority to Provisional application No. 60/515,823, filed Oct. 29, 2003, incorporated herein by reference.

BACKGROUND OF THE INVENTION

I. Field of the Invention

The present invention generally relates to wireless networks and computer communications across wireless networks. More particularly, the invention relates to the updating of the version of an application or data and/or performing actions on a wireless device when a download server has a more recent action list version than what is contained on the wireless device.

II. Description of the Related Art

Wireless devices, such as cellular telephones, communicate packets including voice and data over a wireless network. Cellular telephones themselves are being manufactured with increased computing capabilities and are becoming tantamount to personal computers and hand-held personal digital assistants ("PDAs"). Some wireless devices, such as select cellular telephones, may have an installed application programming computer platform that allows software developers to create software applications that operate on the wireless device.

It is anticipated that systems and methods will be developed to download applications to a wireless device. Accordingly, it is desirable to have a system and method by which applications and data on a wireless device may be updated efficiently and also a mechanism to identify actions that should be performed on a wireless device, taking into account the environment, constraints and impacts of transferring information in a wireless network.

SUMMARY OF THE INVENTION

In one embodiment a method of handling instructions for a wireless device comprises receiving, over a network, a remote action list version number, the remote action list version number associated with a remote action list containing an instruction for the wireless device. Such embodiment also includes determining whether the remote action list version number is different from a local action list version number. Such embodiment also includes sending, over a network, a request for the remote action list in response to determining the remote action list version number is different from the local action list version number. In addition, such embodiment includes receiving, over a network, the remote action list.

In one embodiment a method of handling instructions for a wireless device comprises storing, remote from a wireless device, a remote action list containing an instruction associated with the wireless device, the remote action list having an associated remote action list version number. Such embodiment also includes sending, over a network, the remote action list version number associated with the remote action list. Such embodiment also includes receiving, over a network, a request for the remote action list, the request for the remote action list generated in response to determining the remote action list version number is different from an action list version number stored at the wireless device. In addition, such embodiment includes sending, over a network, the remote action list in response to determining the remote action list version number is different from a local action list version.

In one embodiment a method of handling instructions for a wireless device comprises storing, remote from a wireless device, a remote action list containing an instruction associated with the wireless device, the remote action list having an associated remote action list version number. Such embodiment also includes sending from the wireless device, over a network, a request for the remote action list version number associated with the remote action list. Such embodiment also includes receiving at a server, over a network, the request for the remote action list version number associated with the remote action list. Such embodiment also includes sending from a server, over a network, the remote action list version number associated with the remote action list. Such embodiment also includes receiving at the wireless device, over a network, the remote action list version number associated with the remote action list. Such embodiment also includes determining at the wireless device whether the remote action list version number is different from a local action list version number. Such embodiment also includes sending from the wireless device, over a network, a request for the remote action list in response to determining the remote action list version number is different from the local action list version number. Such embodiment also includes receiving at a server, over a network, the request for the remote action list. Such embodiment also includes sending from a server, over a network, the remote action list in response to determining the remote action list version number is different from the local action list version number. Such embodiment also includes receiving at the wireless device, over a network, the remote action list. Such embodiment also includes executing, at the wireless device, the instructions contained in the remote action list. In addition, such embodiment also includes replacing, at the wireless device, the local action list version number with the remote action list version number.

In one embodiment a method of handling instructions for a wireless device comprises maintaining an action list associated with at least one wireless device group, the action list containing at least one instruction for a wireless device, the wireless device group capable of having a plurality of wireless devices as members. Such embodiment also includes generating a remote action list for a particular wireless device by identifying at least one wireless device group for which the wireless device is a member and by aggregating the action lists associated with the at least one wireless device group. In addition, such embodiment includes generating a remote action list version number associated with the remote action list, the remote action list version number for use by the wireless device to determine whether the remote action list version number is different from a local action list version number.

In one embodiment a wireless device capable of handling instructions comprises logic configured to receive, over a network, a remote action list version number, the remote action list version number associated with a remote action list containing an instruction for the wireless device. Such embodiment also includes logic configured to determine whether the remote action list version number is different from a local action list version number. Such embodiment also includes logic configured to send, over a network, a request for the remote action list in response to determining the remote action list version number is different from the local action list version number. In addition, such embodiment includes logic configured to receive, over a network, the remote action list.

In one embodiment a server for handling instructions for a wireless device comprises logic configured to store, remote from a wireless device, a remote action list containing an instruction associated with the wireless device, the remote action list having an associated remote action list version number. Such embodiment also includes logic configured to send, over a network, the remote action list version number associated with the remote action list. Such embodiment also includes logic configured to receive, over a network, a request for the remote action list, the request for the remote action list generated in response to determining the remote action list version number is different from an action list version number stored at the wireless device. In addition, such embodiment includes logic configured to send, over a network, the remote action list in response to determining the remote action list version number is different from a local action list version.

In one embodiment a system for handling instructions for a wireless device comprises a wireless device and a server. The server includes logic configured to store, remote from a wireless device, a remote action list containing an instruction associated with the wireless device, the remote action list having an associated remote action list version number. The server also includes logic configured to receive, over a network, a request for the remote action list version number associated with the remote action list. The server also includes logic configured to send, over a network, the remote action list version number associated with the remote action list. The server also includes logic configured to receive, over a network, a request for the remote action list. In addition, the server includes logic configured to send, over a network, the remote action list in response to determining the remote action list version number is different from a local action list version number. The wireless device includes logic configured to send, over a network, the request for the remote action list version number associated with the remote action list. The wireless device also includes logic configured to receive, over a network, the remote action list version number associated with the remote action list. The wireless device also includes logic configured to determine whether the remote action list version number is different from the local action list version number. The wireless device also includes logic configured to send, over a network, the request for the remote action list in response to determining the remote action list version number is different from the local action list version number. The wireless device also includes logic configured to receive, over a network, the remote action list. The wireless device also includes logic configured to execute the instructions contained in the remote action list. In addition, the wireless device includes logic configured to replace the local action list version number with the remote action list version number.

In one embodiment a server for handling instructions for a wireless device comprises logic configured to maintain an action list associated with at least one wireless device group, the action list containing at least one instruction for a wireless device, the wireless device group capable of having a plurality of wireless devices as members. Such embodiment also includes logic configured to generate a remote action list for a particular wireless device by identifying at least one wireless device group for which the wireless device is a member and by aggregating the action lists associated with the at least one wireless device group. In addition, such embodiment includes logic configured to generate a remote action list version number associated with the remote action list, the remote action list version number for use by the wireless device to determine whether the remote action list version number is different from a local action list version number.

In one embodiment a computer program embodied on a computer readable medium, the computer program capable of handling instructions for a wireless device, the computer program comprising code operable to receive, over a network, a remote action list version number, the remote action list version number associated with a remote action list containing an instruction for the wireless device. Such embodiment also includes code operable to determine whether the remote action list version number is different from a local action list version number. Such embodiment also includes code operable to send, over a network, a request for the remote action list in response to determining the remote action list version number is different from the local action list version number. In addition, such embodiment includes code operable to receive, over a network, the remote action list.

In one embodiment a computer program embodied on a computer readable medium, the computer program capable of handling instructions for a wireless device, the computer program comprising code operable to store, remote from a wireless device, a remote action list containing an instruction associated with the wireless device, the remote action list having an associated remote action list version number. Such embodiment also includes code operable to send, over a network, the remote action list version number associated with the remote action list. Such embodiment also includes code operable to receive, over a network, a request for the remote action list, the request for the remote action list generated in response to determining the remote action list version number is different from an action list version number stored at the wireless device. In addition, such embodiment includes code operable to send, over a network, the remote action list in response to determining the remote action list version number is different from a local action list version.

In one embodiment a computer program embodied on a computer readable medium, the computer program capable of handling instructions for a wireless device, the computer program comprising code operable to maintain an action list associated with at least one wireless device group, the action list containing at least one instruction for a wireless device, the wireless device group capable of having a plurality of wireless devices as members. Such embodiment also includes code operable to generate a remote action list for a particular wireless device by identifying at least one wireless device group for which the wireless device is a member and by aggregating the action lists associated with the at least one wireless device group. In addition, such embodiment includes code operable to generate a remote action list version number associated with the remote action list, the remote action list version number for use by the wireless device to determine whether the remote action list version number is different from a local action list version number.

In one embodiment a wireless device capable of handling instructions comprising means for receiving, over a network, a remote action list version number, the remote action list version number associated with a remote action list containing an instruction for the wireless device. Such embodiment also including means for determining whether the remote action list version number is different from a local action list version number. Such embodiment also including means for sending, over a network, a request for the remote action list in response to determining the remote action list version number is different from the local action list version number. Such embodiment also including means for receiving, over a network, the remote action list.

In one embodiment a server for handling instructions for a wireless device comprises means for storing, remote from a wireless device, a remote action list containing an instruction associated with the wireless device, the remote action list having an associated remote action list version number. Such embodiment also includes means for sending, over a network, the remote action list version number associated with the remote action list. Such embodiment also includes means for receiving, over a network, a request for the remote action list, the request for the remote action list generated in response to determining the remote action list version number is different from an action list version number stored at the wireless device. In addition, such embodiment includes means for sending, over a network, the remote action list in response to determining the remote action list version number is different from a local action list version.

In one embodiment a system for handling instructions for a wireless device comprises a wireless device and a server. The server includes means for storing, remote from a wireless device, a remote action list containing an instruction associated with the wireless device, the remote action list having an associated remote action list version number. The server also includes means for receiving, over a network, a request for the remote action list version number associated with the remote action list. The server also includes means for sending, over a network, the remote action list version number associated with the remote action list. The server also includes means for receiving, over a network, a request for the remote action list. In addition, the server includes means for sending, over a network, the remote action list in response to determining the remote action list version number is different from a local action list version number. The wireless device includes means for sending, over a network, the request for the remote action list version number associated with the remote action list. The wireless device also includes means for receiving, over a network, the remote action list version number associated with the remote action list. The wireless device also includes means for determining whether the remote action list version number is different from the local action list version number. The wireless device also includes means for sending, over a network, the request for the remote action list in response to determining the remote action list version number is different from the local action list version number. The wireless device also includes means for receiving, over a network, the remote action list. The wireless device also includes means for executing the instructions contained in the remote action list. In addition, the wireless device also includes means for replacing the local action list version number with the remote action list version number.

In one embodiment a server for handling instructions for a wireless device comprises means for maintaining an action list associated with at least one wireless device group, the action list containing at least one instruction for a wireless device, the wireless device group capable of having a plurality of wireless devices as members. Such embodiment also includes means for generating a remote action list for a particular wireless device by identifying at least one wireless device group for which the wireless device is a member and by aggregating the action lists associated with the at least one wireless device group. In addition, such embodiment includes means for generating a remote action list version number associated with the remote action list, the remote action list version number for use by the wireless device to determine whether the remote action list version number is different from a local action list version number.

Additional embodiments are will be apparent in the foregoing description and equivalents thereof.

DETAILED DESCRIPTION OF THE INVENTION

Introduction

Figure 1:
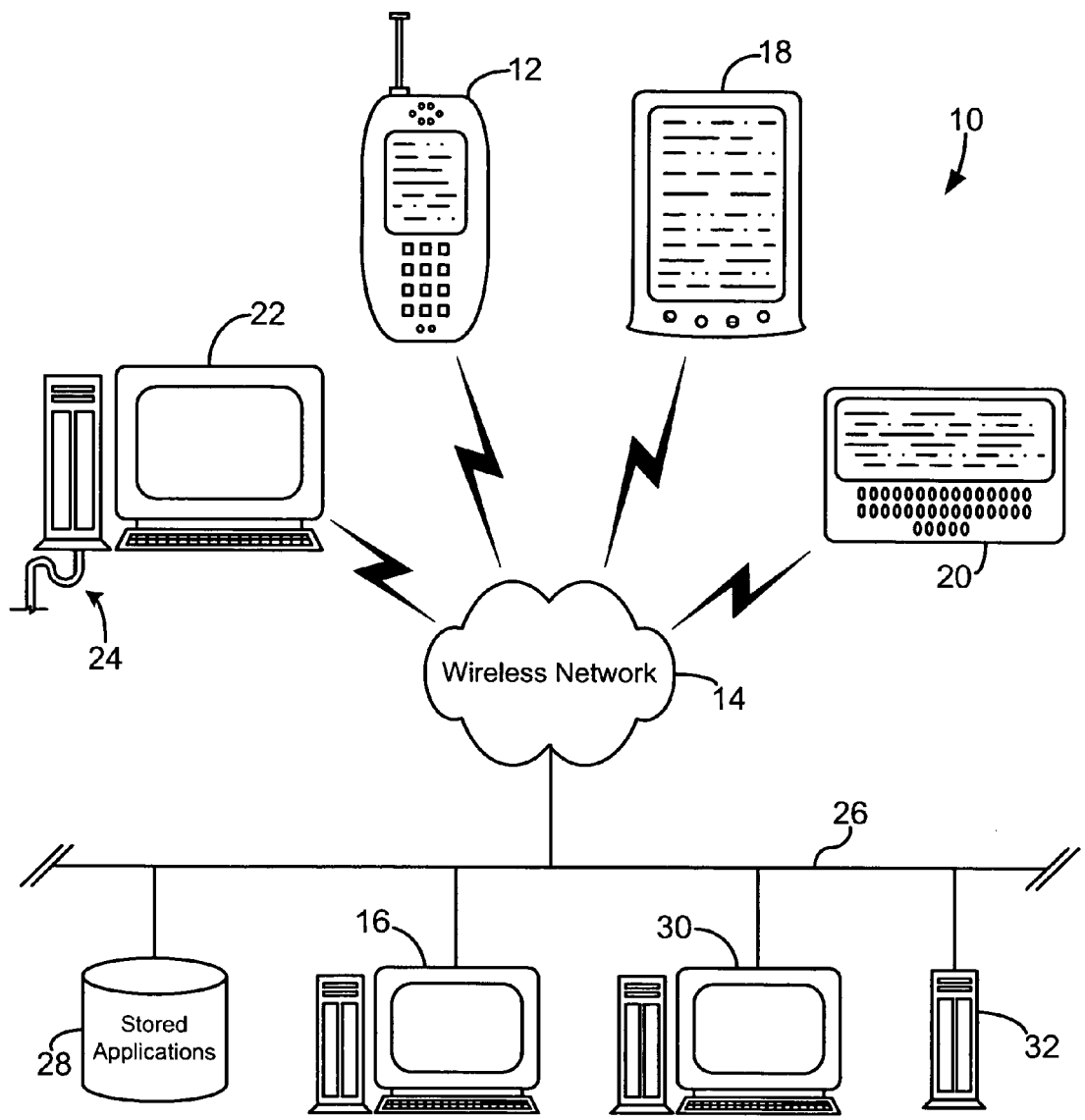
FIG. 1 is a representative diagram of a wireless network and the computer hardware and wireless devices that can be used within the system in an exemplary embodiment of the present invention.

Systems and methods are anticipated that provide for the downloading of software applications to a wireless device. Software applications can come pre-loaded at the time the wireless device is manufactured, or the user may later request that additional programs be downloaded over cellular telecommunication carrier networks, where the programs are executable on the wireless device. As a result, users of wireless devices can customize their wireless devices with programs, such as games, printed media, stock updates, news, or any other type of information or program available for download from application download servers through the wireless network.

In one scenario, if the user of the wireless device desires to download and use a software application or other data using a wireless network, the user will typically either call a service provider or contact the service provider through other means, such as through an Internet access, and the service provider will either transmit the application or data to the wireless device across the wireless network or allow the user access a network site where the application or data is downloadable or accessible. To connect to the application download server, the wireless device bridges a communication connection to the wireless network, such as a cellular network, and then attempts to contact an application download server where the desired software application is resident. Once the wireless device contacts the application download server, an initial connection is made and the application download server determines what applications and data are available to the wireless device and sends the appropriate information, such as a menu, for display on the wireless device so the user can learn of the available applications and data. After access is provided to the downloadable applications, the user of the wireless device can download or any of the available applications or data.

A problem that may arise is that the version of the application or data that the wireless device downloads to be resident thereupon can be updated or altered at the application download server, and the wireless device resident application or data has no simple manner to be likewise updated. The update problem is exacerbated as the wireless device does not always communicate with the application download server every time the wireless device bridges a communication to the wireless network. Because the communication connection from the wireless device to the application download server can be expensive (especially in a cellular network), it is otherwise very expensive for the wireless device to periodically connect to the application download server and check for more recent version of application or software. Furthermore, while each wireless device resident application or data can be checked against its parallel version resident on the download server every time a connection is made to the download server, such checking would lengthen the connection time and cause more expense to the wireless device owner.

Accordingly, systems and methods consistent with the present invention include updating applications and data resident on a wireless device with the most recent version stored on a download server that the wireless device is connected to. Such systems and methods should be able to determine if more recent versions of the wireless device resident applications and data are present on the download server without significantly lengthening the connection duration in order to effect a full comparison of all wireless device resident applications and data. It is thus to the provision of such a system and method of checking and updating wireless device resident applications and data that the present invention is primarily directed.

It is an object to provide systems and methods whereby the datasets, such as applications, information and other data, resident on a wireless device can be updated with the most recent version of the dataset resident on a download server that the wireless device is connected to. The present invention allows a rapid determination as to whether more recent versions of the wireless device resident datasets are present on the download server, and such determination does not significantly lengthen the connection duration between the wireless device and download server. The present invention thus provides an advantage in that it gives a wireless device the ability to quickly execute a full comparison of dataset versions with a download server and download any newer version of a wireless device resident dataset.

Furthermore, as wireless devices become more complex and sophisticated, it is desirable to keep the wireless device up-to-date with actions that need to be performed. For example, an action may include upgrade an application, delete an application, download certain data, disable an application. An action can include modifying the licensing terms associated with an application, for example to upgrade the number of uses for a game application from 10 uses to 100. It will be recognized by those skilled in the art that an action can be any type of instruction(s) that can be performed or initiated by a device. The action may require the wireless device to execute the action within the domain of wireless device, or it may require the wireless device to request an action from another server, such as an application download server, or any combination of such actions.

In addition, it is beneficial that there be a mechanism to be able to store all the actions that needs to be performed by the wireless device without having to send a message to the wireless device immediately to perform the action. A wireless device environment does provide constraints that are not typically contained in the wire-based devices. For example, a wireless device may need to connect to a server. Depending on the service and technology the wireless uses, this may require a separate call or connection.

Requiring a message to be sent or to establish connection can have negative impacts to the wireless subscriber, such as the user of the wireless device may have a plan based on amount of time used. If a call or connection is initiated by the network, it could impact the amount of minutes available to the user. Also, there is processing overhead associated with making a connection and because the wireless device is very sensitive to network usage and processing efficiency, it is preferable to limit the amount of overhead associated with establishing a connection to the wireless device.

EXEMPLARY EMBODIMENT OF THE PRESENT INVENTION

With reference to the figures in which like numerals represent like elements throughout, FIG. 1 illustrates an embodiment of a system 10 for providing subscribed software applications to one or more wireless devices, such as cellular telephone 12, in communication across a wireless network 14 with at least one network server, such as application download server 16, that selectively downloads or provided access to software applications or other data to the wireless devices across a wireless communication portal or other data access to the wireless network 14. As shown here, the wireless device can be a cellular telephone 12, a personal digital assistant 18, a pager 20, which is shown here as a two-way text pager, or even a separate computer platform 22 that has a wireless communication portal, and may otherwise have a wired connection 24 to a network or the Internet. The system 10 can thus be performed on any form of remote computer module including a wireless communication portal, including without limitation, wireless modems, PCMCIA cards, access terminals, personal computers, access terminals, telephones without a display or keypad, or any combination or sub-combination thereof.

The application download server 16 is shown here on a local server-side network 26 with other computer elements in communication with the wireless network 14, such as a database 28 with stored applications and data that contains software applications and data that are accessible and downloadable to the wireless devices 12, 18, 20, 22. There is also shown other network servers, such as server 30 and stand-alone network server 32. The server 30 and 32 can be application or data download servers, or other types of servers that interact with the wireless devices 12, 18, 20, 22 as are known in the art. The servers 16, 30, 32 may have software applications, patches, files, keys, graphics data, compression algorithms, and any type of general data, collectively referred to hereinafter as "datasets," resident thereupon that can be accessed by the wireless devices 12, 18, 20, 22 as is further described herein. It should be noted that server-side functions as described herein can be performed on one server, such as application download server 16. Further, a computer server-side computer platform can provide separate services and processes to the wireless devices 12, 18, 20, 22 across the wireless network 14.

Figure 2:
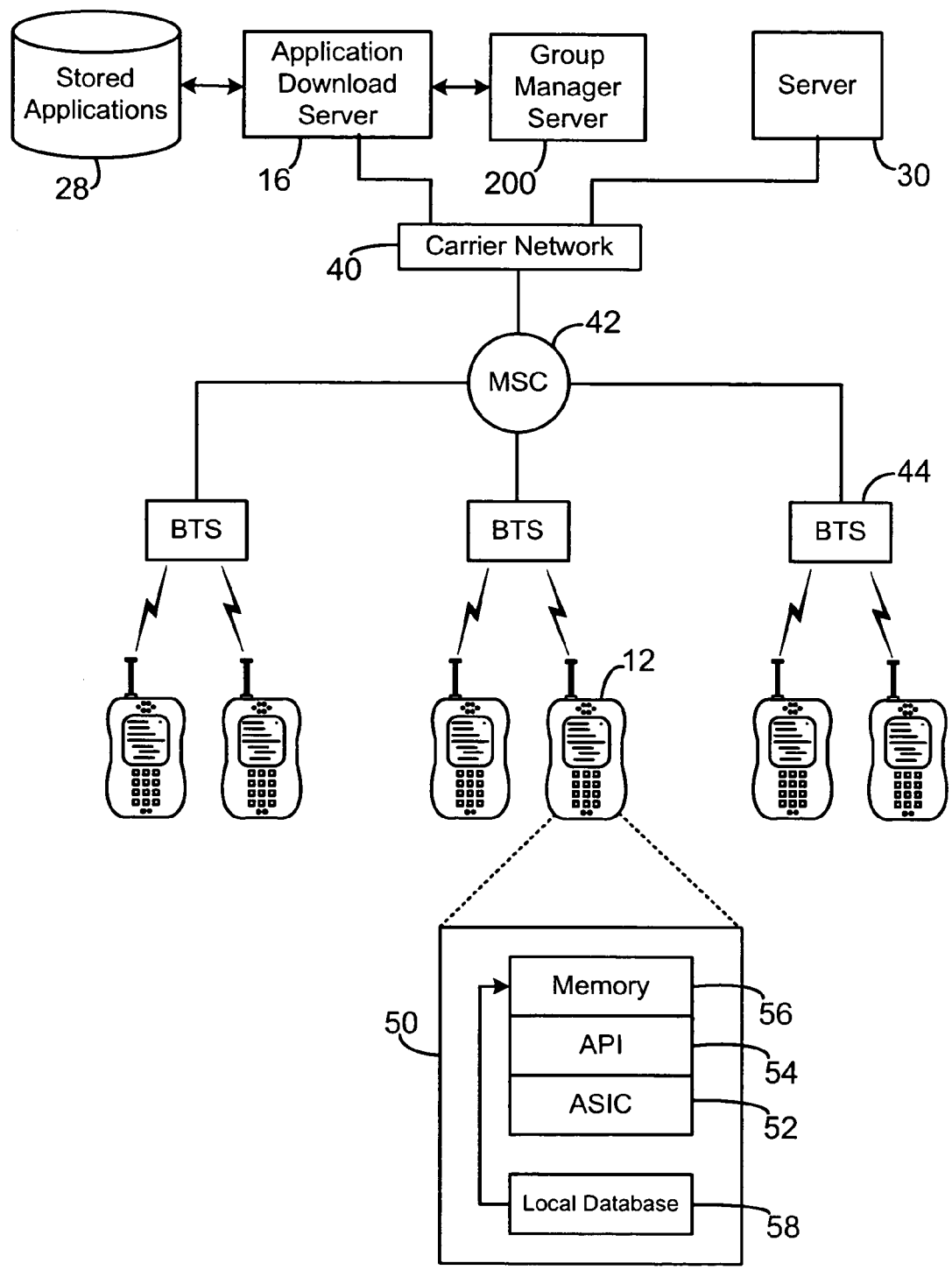
FIG. 2 is a block diagram of the hardware components of the wireless network providing communication between different wireless devices, an application download server, a group manager server, a second network server, and the stored application database in an exemplary embodiment of the present invention.

FIG. 2 is a block diagram that more fully illustrates the components of the wireless network 14 and interrelation of the elements of the system 10. The wireless network 14 is merely exemplary and can include any system whereby remote modules, such as wireless devices 12, 18, 20, 22, communicate over-the-air between and among each other and/or between and among components of a wireless network 14, including, without limitation, wireless network carriers and/or servers, as well as including a non-wireless network alone or in combination with a wireless network. The application download server 16 and the stored applications database 28, other servers 30, 32, including group manager server 200, will be present on the cellular data network with any other components that are needed to provide cellular telecommunication services. The application download server 16, and/or other servers 30, 32, 200 communicate with a carrier network 40, through a data link, such as the Internet, a secure LAN, WAN, or other network. The carrier network 40 controls messages (generally being data packets) sent to a messaging service controller ("MSC") 42. The carrier network 40 communicates with the MSC 42 by a network, the Internet and/or POTS ("plain ordinary telephone system"). Typically, the network or Internet connection between the carrier network 40 and the MSC 42 transfers data, and the POTS transfers voice information. The MSC 42 is connected to multiple base stations ("BTS") 44. In a similar manner to the carrier network, the MSC 42 is typically connected to the BTS 44 by both the network and/or Internet for data transfer and POTS for voice information. The BTS 44 ultimately broadcasts messages wirelessly to the wireless devices, such as cellular telephone 12, by short messaging service ("SMS"), or other over-the-air methods known in the art.

The wireless device, such as cellular telephone 12, has a computer platform 50 that can receive and execute software applications and display data transmitted from the application download server 16 or other network servers 30, 32, 200. The computer platform 50 may also include an application-specific integrated circuit ("ASIC") 52, or other processor, microprocessor, logic circuit, or other data processing device. The ASIC 52 or other processor executes the application programming interface ("API") layer 54 that interfaces with any resident programs in the memory 56 of the wireless device. The memory can be comprised of read-only or random-access memory (RAM and ROM), EPROM, EEPROM, flash cards, or any memory common to computer platforms. The computer platform 50 also includes a local database 58 that can hold the software applications, file, or data not actively used in memory 56, such as the software applications or downloaded from the application download server 16. The local database 58 is typically comprised of one or more flash memory cells, but can be any secondary or tertiary storage device as known in the art, such as magnetic media, EPROM, EEPROM, optical media, tape, or soft or hard disk.

The wireless device, such as cellular telephone 12, can access and download many types of applications, such as games and stock monitors, or simply data such as news and sports-related data. The downloaded data can be immediately displayed on the display or stored in the local database 58 when not in use. The software applications can be treated as a regular software application resident on the wireless device 12, 18, 20, 22, and the user of the wireless device can selectively upload stored resident applications from the local database 58 to memory 56 for execution on the API 56. The end-user of the wireless device 12, 18, 20, 22 can also selectively delete a software application from the local database 58 whereby other applications and data can be downloaded into the cleared storage space.

A group manager server 200 may be used to manage actions lists and action versions associated with the wireless devices 12. In one embodiment, actions are defined to be performed on a wireless device. These actions may be requested by a carrier, application developer, network operator or other entity desiring to impact the environment of the wireless device. While not shown, a separate interface to the group manager server 200 may exist so that actions for a wireless device may be entered into the group manager.

The group manager may implement a group scheme to track the actions associated with a group of wireless devices. For example, a set of wireless devices may belong to a company and a group can be established for those wireless devices belonging to that company. If the company wants a particular application distributed to all the wireless devices of the company, the group manager may be configured in such a way as to allow the action of "Install Application xxx" to all wireless devices in a group.

The wireless device may be part of multiple groups. For example, it may be part of a company group, it may be part of a device type (a specific model of wireless device) group, etc. The definition of groups can be arbitrary so a group may be established by any criteria desired.

The group manager server 200 generates the action list associated with a wireless device.

When the action list changes, the group manager server 200 also changes the action list version so that the wireless device can check the version of its current action list to quickly determine if additional actions need to be performed.

When using groups to help manage the action lists associated with a wireless device, hashing algorithms based on the groups the wireless device is associated with may be used to simplify the creation of action lists. Alternatively, while this may impact the processing and storage efficiency, the group manager may also simply store the action list associated with each of the wireless device instead of using a hashing or other algorithm to help manage actions associated with each wireless device.

The group manager is connected to an application download server 16 so that it may transfer the action lists and the current action list version associated with a wireless device.

Groups

The following is an example of delineating groups and using action lists. Assume Device ID 111 is part of Group 1, Group 2 and Group 111, but Device ID 222 is only part of Group 2. A combined group action list may be developed by groups that include the following:

TABLE 1

Group actions list

| Group No. | Action | parameter 1 | parameter 2 | parameter 3 |
|---|---|---|---|---|
| Group 1 | Install | App1 | | |
| Group 2 | Install | App2 | | |
| Group 1 | Delete | App3 | | |
| Group 3 | Upgrade | App4 | 100 | Uses |
| Group 111 | Delete | Data5 | | |

When the Action list for Device ID 111 is developed, knowing that it is part of Groups 1, 2 and 111, all the actions associated with those groups are compiled for the Device ID 111 action list. Note that a group may be defined containing only that Device's ID (e.g., "Group 111" is a group on one containing only Device 111) so that actions may be defined solely to that device. The action list for Device ID 222 is developed only by pulling out those actions associated with Group 2 (and its individual group if any actions were listed), since that is the only group it is a part of that has any actions associated with it.

Action Lists

Action lists, as described above, include actions to be performed by the wireless device. These may include any actions that the wireless device may initiate. An example of an action list for a specific device is in Table 2:

TABLE 2

| Action List | |
|---|---|
| File: | Application 1 |
| Action Type: | Install |
| File: | Application 2 |
| Action Type: | Delete |
| File: | Application 3 |
| Action Type: | Upgrade |
| Price Type: | 100 |
| Price Base Type: | Uses |
| File: | Application 4 |
| Action Type: | Disable |

Note that Table 2 only includes a limited number of actions and is not intended to indicate the complete number of actions that may be performed. Note that action lists may also include data (such as Application 3 having the data of price type and Price Base Type, indicating to upgrade the application to 100 uses). While Table 2 only refers to applications, any instruction that can be recognized by the wireless device may be included in the action lists, including instructions that use data or any file type.

Furthermore action lists and the described embodiments allow actions to be performed by the wireless device automatically without the user needing to initiate any actions: It may be preferable to indicate to the user that actions are occurring, but that is an implementation decision.

Figure 3:
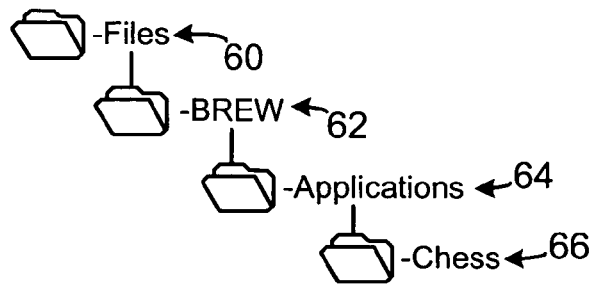
FIG. 3 is a file tree illustrating an exemplary file structure resident on the computer platform of the wireless device in an exemplary embodiment of the present invention.

With reference to FIG. 3, the computer platform 50 of the wireless device (such as cellular telephone 12) will have a data or file structure resident thereon. The category Files 60 within it the API file called BREW 62, representing the API in the platform, in this case the BREW® API developed by QUALCOMM, Incorporated, and BREW 62 contains an applications file 64 with a specific chess game held in a chess folder 66. All of these files can be "versioned" wherein updates to the data in each file give the file a different version to identify what changes have been made in the data. The server, such as application download server 16, will keep its own resident copy of the application and data files such that a wireless device 12, 18, 20, 22 contacting the server can download copies of the applications and data to selectively overwrite the wireless device resident copy.

Figure 4:
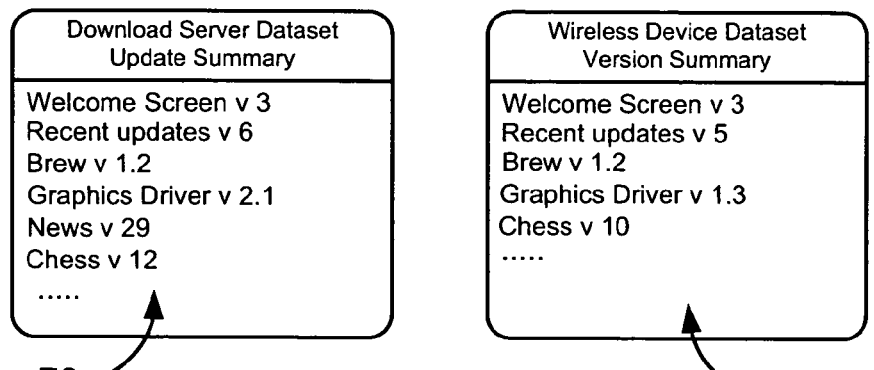
FIG. 4 illustrates the download server dataset update summary file and wireless device dataset version summary file, which are compared to determine if new versions of wireless device resident datasets are present on the download server in an exemplary embodiment of the present invention.

The present invention allows the creation of "summary files" of the versions of some or all datasets resident on the wireless device 12, 18, 20, 22 or download server, such as application download server 16. As shown in FIG. 4, the download server 16, 30, 32, 200 preferably maintains a download server dataset update summary file 70, and the wireless device 12, 18, 20, 22 will maintain wireless device dataset version summary file 72 that contain or reference some or all files on the server or computer platform 50 respectively.

The system 10 thus selectively updates the versions of stored datasets on a wireless device 12, 18, 20, 22 attempting to communicate with at least one download server (application download server 16) across the wireless network 14, through the computer platform 50 of the wireless device comparing the version of each specific resident dataset listed in the resident dataset version summary file 72 with the version of the downloadable dataset resident on the download server, preferably stored in a download server dataset update summary 70, to thereby determine if the version of the wireless device resident dataset is different from the version of the download server resident dataset. And upon determining the version of the wireless device resident dataset is different from the version of the download server resident dataset, the computer platform 50 of the wireless device can download the download server resident dataset to overwrite the old version of the application or data resident and be executable on the wireless device 12, 18, 20, 22. Other methods can be used on the download server 16, 20, 32 to provide version information to wireless devices 12, 18, 20, 22, such as a header for each dataset file, a direct comparison of the dataset after a predetermined duration since download, or a command can be present in the wireless device-download server handshake that informs the wireless device to compare a specific dataset to determine if the wireless device has the most recent version.

The download server dataset update summary file 70 can identify the versions of files or datasets resident on the download server, such as a graphics data that is present in a welcome screen file, device drivers such as a graphics driver file, and the chess file 66.

The wireless device dataset version summary file 72 has parallel files to those resident on the download server dataset update summary file 70 and can compare each version of the datasets through a simple file comparison between the download server dataset update summary file 70 and the wireless device dataset version summary file 72 and locate different version numbers. The summary files 70 and 72 are shown here as having a greater number indicating a more recent version of the dataset. Other systems and method could be used to indicate the version difference as would be known in the art, such as an alphanumeric or other symbolic system that is predefined such that the computer platform 50 of the wireless device 12, 18, 20, 22 can determine if an individual download server resident dataset is a newer version than the wireless device resident dataset.

In the structure shown in FIG. 4, if a version number of the download server resident dataset is greater than the version number of the wireless device resident dataset, then the computer platform 50 of the wireless device 12, 18, 20, 22 will download the newer version of the dataset from the download server 16, 30, 32, 200. After it has been determined that a newer dataset version is on the download server, the computer platform 50 of the wireless device 12, 18, 20, 22 can prompt the user of the wireless device 12, 18, 20, 22 to communicate with the download server to download the different version of the download server resident dataset to be executable on the wireless device. The prompting of the user to make the communication may be important in certain circumstances, such as if the owner of the wireless device 12, 18, 20, 22 will be billed for the communication connection. Otherwise, upon the determination that the version of the wireless device resident dataset is different from the version of the download server resident dataset, the computer platform 50 of the wireless device 12, 18, 20, 22 can automatically download the different download server resident dataset to overwrite the wireless device resident dataset.

Figure 5:
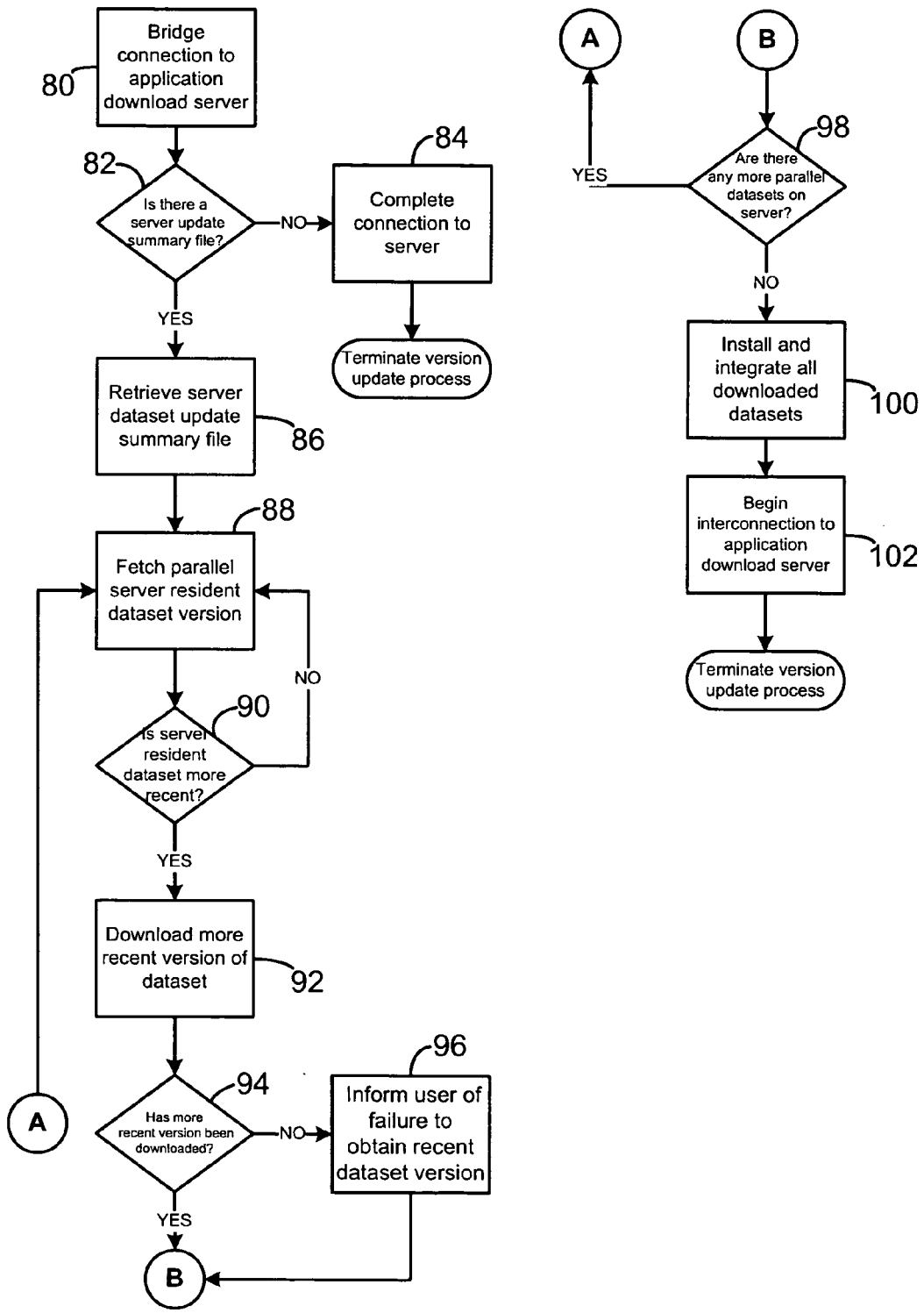
FIG. 5 is a flowchart illustrating the process executing on the wireless device in updating the wireless device resident datasets with newer versions present on a download server when the wireless device initially contacts the download server in an exemplary embodiment of the present invention.

The specific process executing on the wireless device, such as cellular telephone 12, is shown in the flowchart of FIG. 5. The wireless device 12, 18, 20, 22 bridges a connection to an application download server 16 (or other network server) as shown in step 80, and then determine whether there is a download server version dataset update summary file 70 present, as shown by decision 82. If the download server keeps track of changes to resident dataset versions in a manner other than an update summary file 70, then decision 82 would be made in accord with the other method. If there is not a download server dataset update summary file 70 present at decision 82 (or other version comparison method present), then the connection to the application download server 16 is otherwise completed, and the version update process is terminated. If there is a download server dataset update summary file 70 present at decision 82, then the download server dataset update summary file 70 is retrieved by the wireless device 12, 18, 20, 22 as shown at step 86, and the first parallel dataset version for which the wireless device has a resident copy of is fetched, as shown at step 88.

A determination is then made as to whether the download server resident dataset is a more recent version than the wireless device resident dataset, as shown at decision 90. If the download server dataset is not more recent at decision 90, then the process returns to step 88 to fetch the next download server resident dataset version. If the download server resident dataset is a more recent version at decision 90, then the wireless device downloads to the computer platform 50 the more recent version of the dataset from the download server, as shown at step 92. A check is made to determine if the more recent version of the dataset was downloaded, as shown at decision 94. If the more recent version of the dataset was not downloaded at decision 92, then the user of the wireless device is informed of the failure to download the more recent dataset version, as shown at step 96, and the process continues to decision 98. Otherwise, if the more recent dataset version was downloaded at decision 94, then a determination is made as to whether there are any further datasets resident on the download server that are parallel to datasets resident on the wireless device 12, 18, 20, 22, as shown at decision 98.

If there are more parallel datasets on the download server at decision 98, then the process returns to step 88 wherein another parallel download server resident dataset is fetched. If there are no further parallel download server resident datasets present at decision 98, then the downloaded datasets are installed and integrated on the computer platform 50 of the wireless device 12, 18, 20, 22 as shown at step 100, and the interconnection between the wireless device and application download server 16 is begun, as shown at step 102. The interconnection between the wireless device and download server typically provides a menu or other data connectivity therebetween. After the interconnection is begun at step 102, the version update process is terminated.

Figure 6:
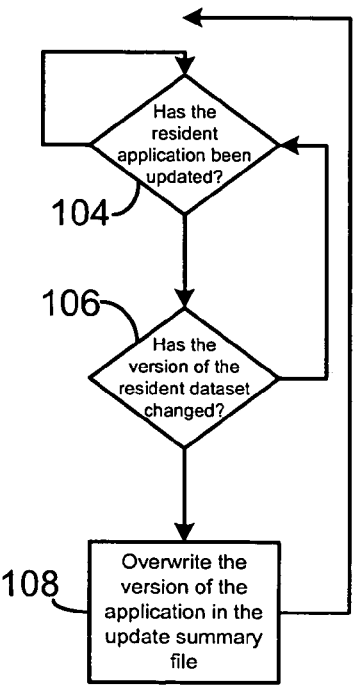
FIG. 6 is a flowchart illustrating the process executing on the download server in maintaining the most recent version of the download server resident datasets in the update summary file in an exemplary embodiment of the present invention.

FIG. 6 illustrates the process executing on the download server 16, 30, 32, 200 to insure that the download server dataset update summary file 70 has the most current version information. A sub-routine executing on the download server 16, 30, 32, 200 makes a first determination as to whether the download server resident dataset has been updated, as shown at decision 104. If the resident dataset has not been updated, then the process enters a wait state by returning to decision 104, until a resident dataset is updated. Otherwise, if the resident dataset has been updated at decision 104, then a decision is made as to whether the version of the dataset as listed in the download server dataset update summary requires updating, as shown at decision 106. If the version of the resident dataset does not require updating, then the process returns to the wait state at decision 106 until an update is made to resident datasets. And if the version of the resident dataset has changed at decision 106, then the version of the dataset in the download server dataset update summary 70 is overwritten so that connecting wireless devices 12, 18, 20, 22 will be able to learn and download the newer version of the dataset.

The system 10 thus provides a method for selectively updating the versions of stored datasets on a wireless device 12, 18, 20, 22 including communicating from the wireless device 12, 18, 20, 22 to the download server 16, 30, 32 across the wireless network 14, comparing, at the computer platform 50 of the wireless device, the version of each specific resident dataset listed in the resident dataset version summary file 72 with the version of the downloadable dataset resident on the download server 16, 20, 22, and determining if the version of the wireless device resident dataset is different from the version of the download server resident dataset based upon the comparison. The method may further include downloading the different download server resident dataset to the computer platform 50 of the wireless device 12, 18, 20, 22 from the download server 16, 20, 22 to be executable on the wireless device upon determining the version of the wireless device resident dataset is different from the version of the download server resident dataset.

If the download server 16, 30, 32, 200 stores the record indicating the version of the download server resident dataset in a version update file 70 the step of comparing, at the computer platform 50 of the wireless device 12, 18, 20, 22, the version of each specific resident dataset listed in the resident dataset version summary file 72 with the version of the downloadable dataset resident on the download server, is comparing the update summary file 70 of the download server to the version summary file 72 of the wireless device to thereby determine if the versions of the wireless device resident datasets are different from the versions of the download server resident datasets. The method can also include either prompting the user of the wireless device 12, 18, 20, 22 to communicate with the download server 16, 30, 32, 200 to download the different version of the download server resident dataset to be executable on the wireless device, or automatically downloading the different download server resident dataset to the computer platform 50 of the wireless device upon determining the download server resident dataset is a different version than the wireless device resident dataset.

The invention further includes a wireless device 12, 18, 20, 22 including a computer platform 50 with at least one file resident thereon where the wireless device 12, 18, 20, 22 in selective communication to one or more network servers across a wireless network 14 with each network server selectively downloading datasets to the wireless device 12, 18, 20, 22. Upon the wireless device 12, 18, 20, 22 attempting to communicate with a download server 16, 30, 32, 200 across the wireless network 13, the computer platform 50 of the wireless device compares the version of each specific resident dataset listed in the resident dataset version summary file 72 with the version of the downloadable dataset resident on the download server 16, 30, 32, 200 to thereby determine if the version of the wireless device resident dataset is different from the version of the download server resident dataset. Preferably, upon determining the version of the wireless device resident dataset is different from the version of the download server resident dataset, the computer platform 50 of the wireless device downloads the download server resident dataset. The computer platform 50 of the wireless device can prompt the user of the wireless device 12, 18, 20, 22 to communicate with the download server 16, 30, 32, 200 to download the different version of the download server resident dataset, or automatically download the different download server resident dataset to be executable on the wireless device 12, 18, 20, 22.

In one embodiment with an update summary file 70 resident on the download server, the computer platform 50 of the wireless device 12, 18, 20, 22 compares the update summary file 70 of the download server to the version summary file 72 of the wireless device to thereby determine if the versions of the wireless device resident datasets are different from the versions of the download server resident datasets.

The present invention includes a program resident in a computer readable medium, where the program directs a wireless device having a computer platform to perform the inventive steps of the method. The computer readable medium can be the memory 56 of the computer platform 50 of the cellular telephone 12, or other wireless device 18, 20, 22, or can be in a local database, such as local database 58 of the cellular telephone 12. Further, the computer readable medium can be in a secondary storage media that is loadable onto a wireless device computer platform, such as a magnetic disk or tape, optical disk, hard disk, flash memory, or other storage media as is known in the art.

Processing Action Lists and Versioning

Figure 7:
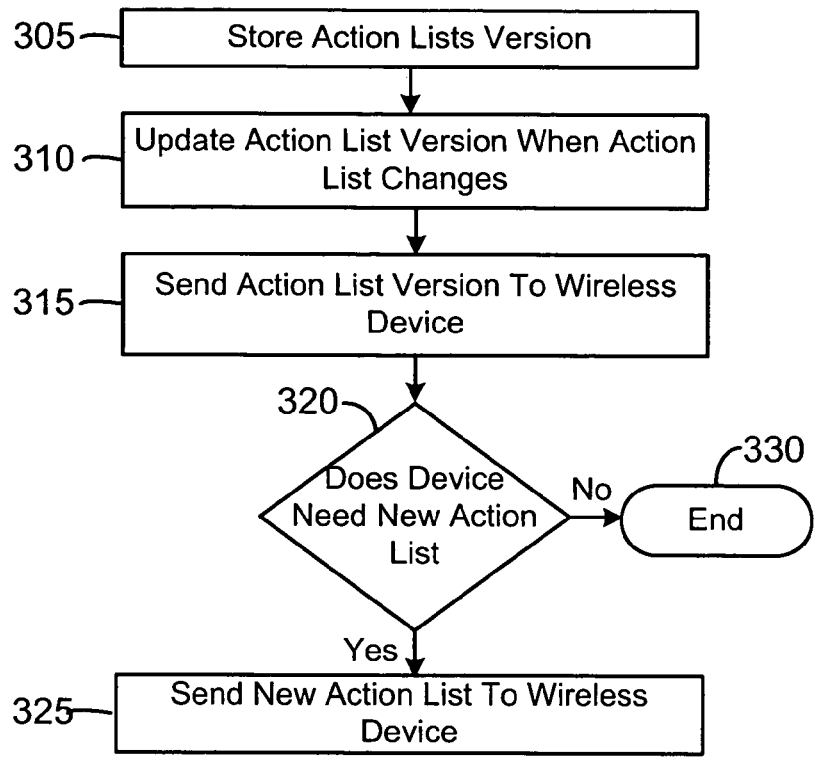
FIG. 7 is a flowchart depicting the process performed by the application download server in an exemplary embodiment of the present invention.

FIG. 7 is a flowchart depicts the process performed by the application download server in an exemplary embodiment of the present invention. As described above, the application download server stores the action lists version associated with a wireless device. The association may be by subscriber identification.

In one embodiment, the wireless device indicates what groups that it is a part of. The application download server then determines, via internal processing or using a group manager server, the action list version associated with the groups the wireless device is a part of.

When an action is added to the action list, i.e., an action needs to be performed by a wireless device, the action list version is updated (Step 310). This update may occur in response to a request coming in from the wireless device. In this instance, the application download server sends a request to the group server and the group server indicates that there is a upgrade action list version or not.

Alternatively, the group manager may have received an action added to the list associated with the wireless device and updated the action list version and sent the upgraded action list version to the wireless device.

When the wireless device connects to the application download server, it sends a message to the application download server to get the action list version. Note the wireless device may send this message while it is waiting on or initiating other tasks with the application download server or other servers. In this manner, it can save overhead processing associated with making the connection to the server.

In response to the request, the application download server send the action list version to the wireless device (Step 315). If it is determined that the wireless device needs a new action list (step 320), then the application download server sends the new action list associated with the version to the wireless device (Step 325).

In performing this method, the application download server may initiate a request to the group manager to determine the latest action list version and the latest action list associated with the wireless device. The wireless device sends some identifying information, such as the subscriber identification (SID), to the application download server so that that action list version and the action list associated with the wireless device can be determined.

Figure 8:
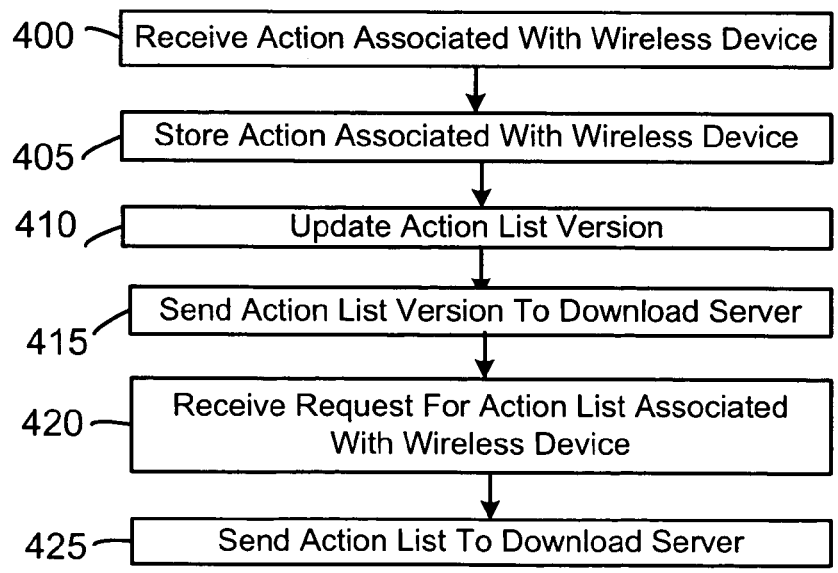
FIG. 8 is a flowchart depicting the process performed by the group manager in an exemplary embodiment of the present invention.

FIG. 8 is a flowchart depicting the process performed by the group manager server in an exemplary embodiment of the present invention. An action is received associated with a wireless device (Step 400). As indicated in the description above, the action may be associated with a group and group manager server may use a group managing scheme.

Furthermore, the associating may be by a unique wireless device identification, such as a subscriber id. Next the action is stored (step 405) and associated with the wireless device.

When an action is added to the action list associated with the wireless device, the action list version is updated (Step 410). The action list version update may be initiated upon the addition of the action to the list. Alternatively, the action list version may be generated when the request comes in from the wireless device to check the action list version. Furthermore, the action list and action list version may be generated using a hashing algorithm with groups and a group managing scheme.

The action list version is sent to the application download server (Step 415). This may be in response to a request from the application download server or alternatively may be initiated by the group manager so that the application download server has the latest version stored internally.

If the action list is needed by the application download server or the wireless device, the group manager server will receive a request for an action list associated with the wireless device (Step 420) and in response to receiving the request, will compile the action lists and send it to the application download server (Step 425).

Figure 9:
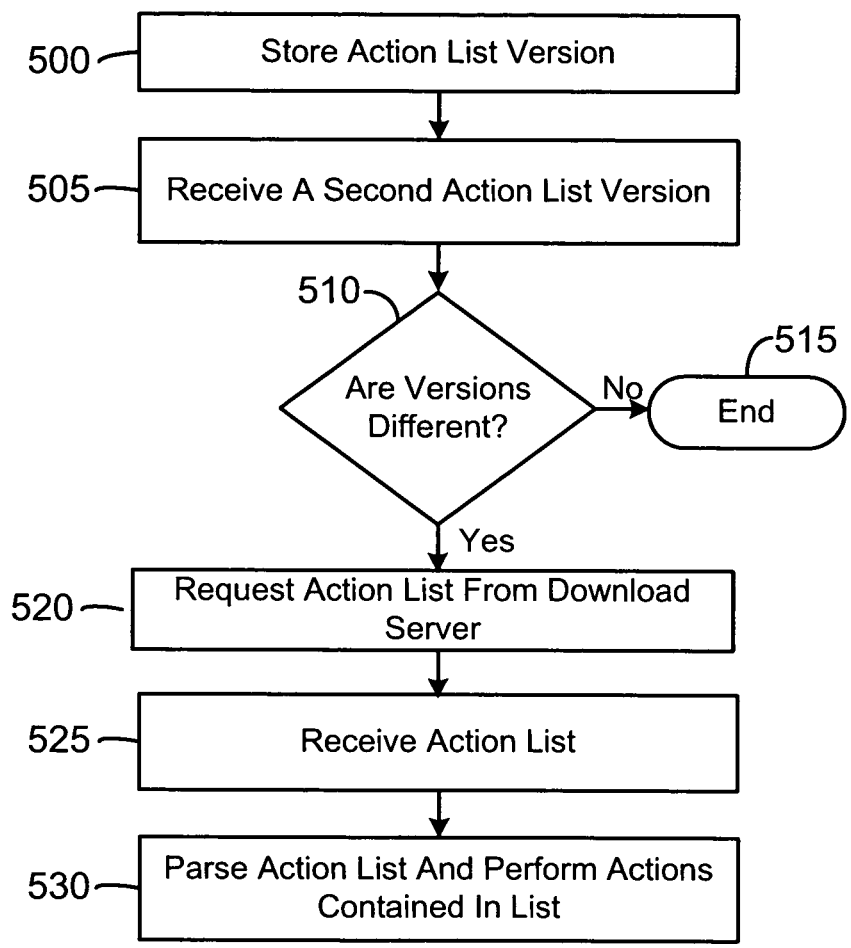
FIG. 9 is a flowchart illustrating the process performed by the wireless device in an exemplary embodiment of the present invention.

FIG. 9 is a flowchart illustrating the process performed by the wireless device in an exemplary embodiment of the present invention. The wireless device stores an action list version associated with the last action list it received (Step 500). The action list version may have been generated by the application download server or the group manager server and sent to the wireless device along with the action list.

The wireless device receives another action list version (Step 505). This action list version may be in response to a request to for the action list version by the wireless device or may be initiated by one of the servers. After receiving the second action list, the wireless device compares the second action list with the one stored previously (Step 510). If the versions are the same, the process ends (Step 515).

If the versions are different, then the "Yes" branch is followed and the wireless device requests the action list associated with the second action list version from the download server (Step 520). The wireless device may concurrently with this request or have previously given the application download server an identifier, such as a subscriber ID, so that the application download could send the action list version and action list associated with the wireless device.

The wireless device then receives the action list (Step 525). The action list contains actions associated with wireless device. The wireless device than parses the action list and initiates the actions contained in the action list (Step 530). The wireless device also updates the stored action list version to the second action list version, which is associated with the action list just downloaded.

Figure 10:
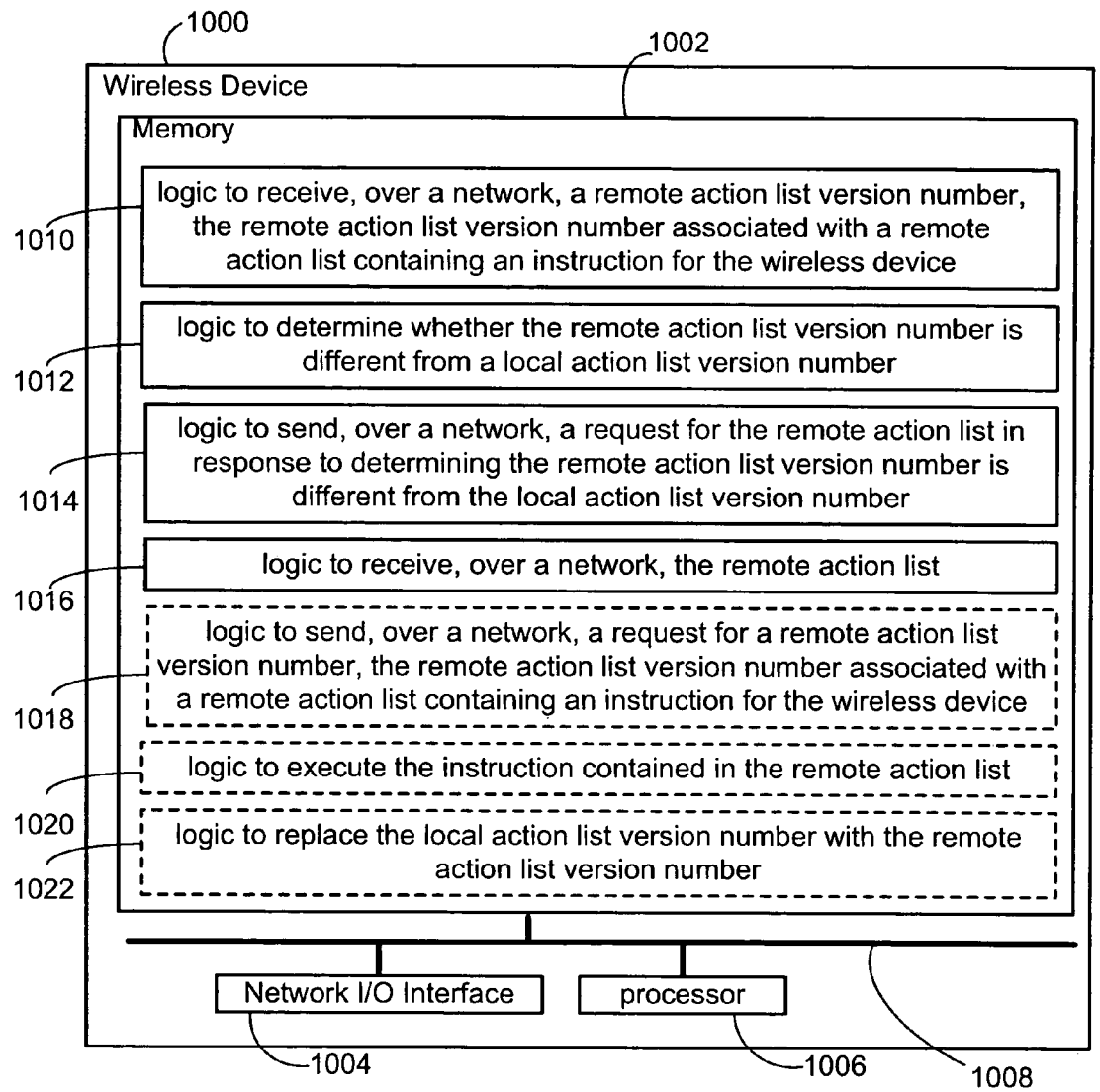
FIG. 10 is a block diagram of a wireless device in an exemplary embodiment of the present invention.

FIG. 10 shows one embodiment of a wireless device implementing a version of performing actions on a wireless device using action lists and versioning. As shown, a wireless device 1000 contains a memory 1002, a network interface 1004, a processor 1006 and a bus 1008. Although the memory 1002 is shown as RAM memory, other embodiments include such memory 1002 as all known types of memory that are known to provide for the storing of configured logic. In addition, although memory 1002 is shown as one contiguous unit of one type of memory, other embodiments use multiple locations and multiple types of memory as memory 1002. The network I/O interface 1004 provides input and output to devices coupled to the network via the bus 1008. The processor 1006 operates on instructions and data provided via the bus 1008. In at least one embodiment processor 1006 is part of ASIC 52.

Located in memory 1002 is logic 1010 to receive, over a network, a remote action list version number, the remote action list version number associated with a remote action list containing an instruction for the wireless device, logic 1012 to determine whether the remote action list version number is different from a local action list version number, logic 1014 to send, over a network, a request for the remote action list in response to determining the remote action list version number is different from the local action list version number, logic 1016 logic to receive, over a network, the remote action list. In one or more different embodiments the wireless device includes optional logic 1018 to send, over a network, a request for a remote action list version number, the remote action list version number associated with a remote action list containing an instruction for the wireless device. Also in one or more different embodiments the wireless device includes optional logic 1020 to execute the instruction contained in the remote action list. In addition, in one or more different embodiments the wireless device includes optional logic 1022 to replace the local action list version number with the remote action list version number.

Figure 11:
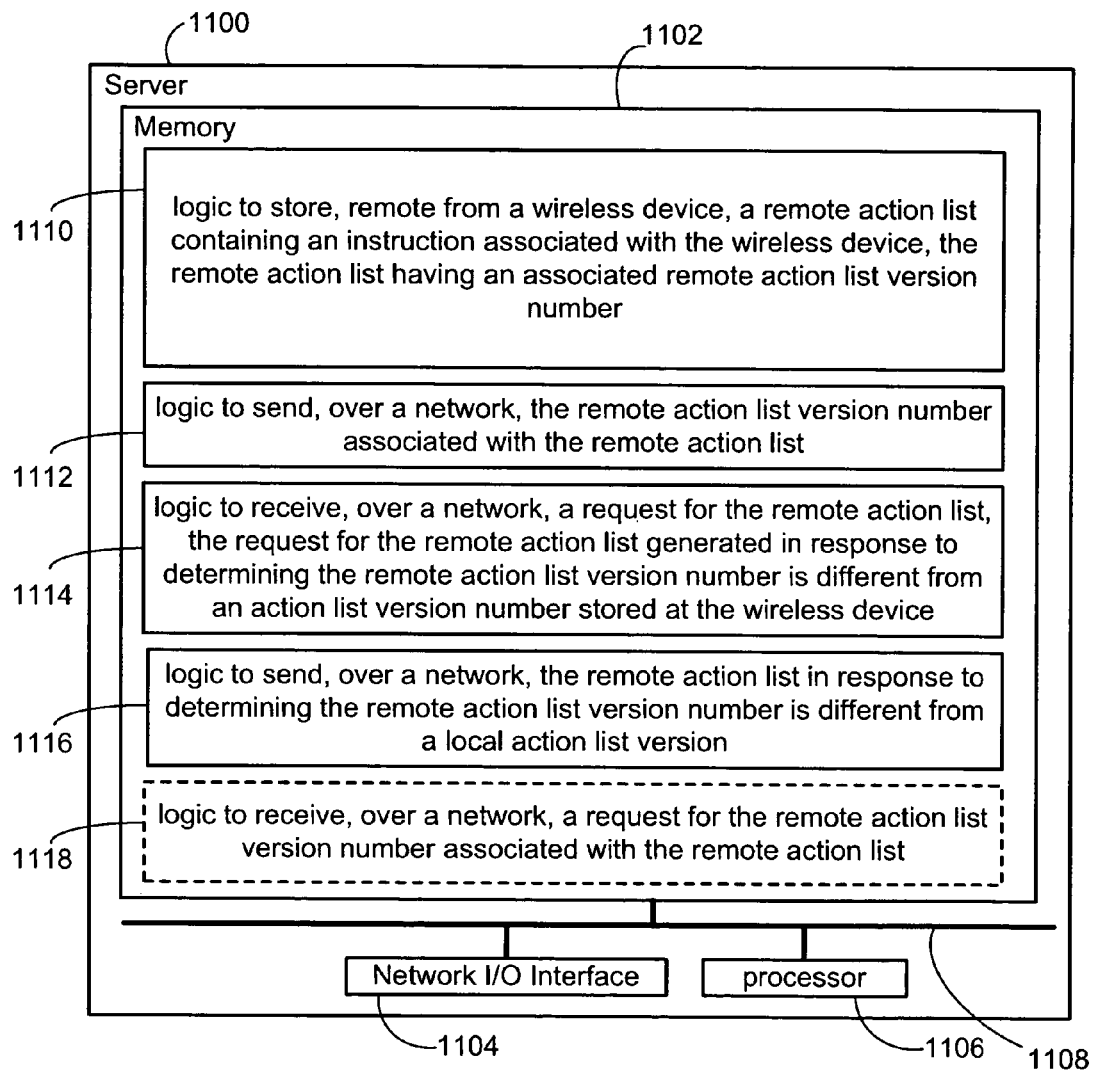
FIG. 11 is a block diagram of a server in an exemplary embodiment of the present invention.

FIG. 11 shows one embodiment of a server implementing a version of performing actions on a wireless device using action lists and versioning. As shown, a server 1100 contains a memory 1102, a network interface 1104, a processor 1106 and a bus 1108. Although the memory 1102 is shown as RAM memory, other embodiments include such memory 1102 as all known types of memory that are known to provide for the storing of configured logic. In addition, although memory 1102 is shown as one contiguous unit of one type of memory, other embodiments use multiple locations and multiple types of memory as memory 1102. The network I/O interface 1104 provides input and output to devices coupled to the network via the bus 1108. The processor 1106 operates on instructions and data provided via the bus 1108. In at least one embodiment processor 1106 is part of ASIC 52.

Located in memory 1102 is logic 1110 to store, remote from a wireless device, a remote action list containing an instruction associated with the wireless device, the remote action list having an associated remote action list version number, logic 1112 to send, over a network, the remote action list version number associated with the remote action list, and logic 1114 to receive, over a network, a request for the remote action list, the request for the remote action list generated in response to determining the remote action list version number is different from an action list version number stored at the wireless device In one or more different embodiments the server includes optional logic 1116 to send, over a network, the remote action list in response to determining the remote action list version number is different from a local action list version. Also in one or more different embodiments the server includes optional logic 1118 to receive, over a network, a request for the remote action list version number associated with the remote action list.

Figure 12:
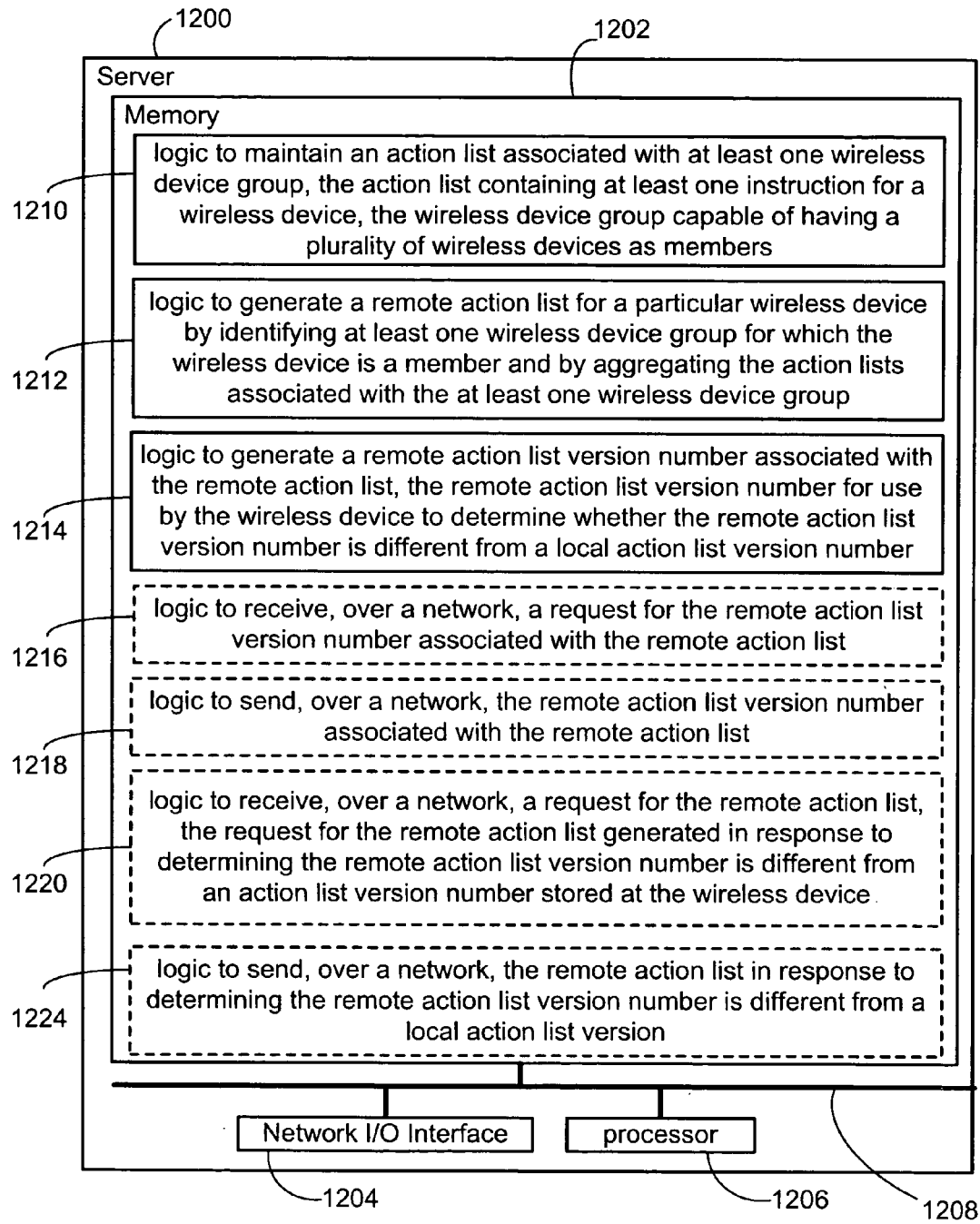
FIG. 12 is a block diagram of a server in an exemplary embodiment of the present invention.

FIG. 12 shows one embodiment of a server implementing a version of performing actions on a wireless device using action lists and versioning. As shown, a server 1200 contains a memory 1202, a network interface 1204, a processor 1206 and a bus 1208. Although the memory 1202 is shown as RAM memory, other embodiments include such memory 1202 as all known types of memory that are known to provide for the storing of configured logic. In addition, although memory 1202 is shown as one contiguous unit of one type of memory, other embodiments use multiple locations and multiple types of memory as memory 1202. The network I/O interface 1204 provides input and output to devices coupled to the network via the bus 1208. The processor 1206 operates on instructions and data provided via the bus 1208. In at least one embodiment processor 1206 is part of ASIC 52.

Located in memory 1202 is logic 1210 to maintain an action list associated with at least one wireless device group, the action list containing at least one instruction for a wireless device, the wireless device group capable of having a plurality of wireless devices as members, logic 1212 to generate a remote action list for a particular wireless device by identifying at least one wireless device group for which the wireless device is a member and by aggregating the action lists associated with the at least one wireless device group, and logic 1214 to generate a remote action list version number associated with the remote action list, the remote action list version number for use by the wireless device to determine whether the remote action list version number is different from a local action list version number. In one or more different embodiments the server includes optional logic 1216 to receive, over a network, a request for the remote action list version number associated with the remote action list. Also in one or more different embodiments the server includes optional logic 1218 to send, over a network, the remote action list version number associated with the remote action list. Also in one or more different embodiments the server includes optional logic 1220 to receive, over a network, a request for the remote action list, the request for the remote action list generated in response to determining the remote action list version number is different from an action list version number stored at the wireless device. Also in one or more different embodiments the server includes optional logic 1224 to send, over a network, the remote action list in response to determining the remote action list version number is different from a local action list version.

The present invention may be implemented, for example, by operating portion(s) of the wireless network 14 to execute a sequence of machine-readable instructions, such as wireless platform 50, the application download server 16, and any other network server 30, 32. The instructions can reside in various types of signal-bearing or data storage primary, secondary, or tertiary media. The media may comprise, for example, RAM (not shown) accessible by, or residing within, the components of the wireless network 14.

Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog transmission media.

While the foregoing disclosure shows illustrative embodiments of the invention, it should be noted that various changes and modifications could be made herein without departing from the scope of the invention as defined by the appended claims. Furthermore, although elements of the invention may be described or claimed in the singular, the plural is contemplated unless limitation to the singular is explicitly stated.

What is claimed is:

1. A method of handling instructions for a wireless device, comprising:
   receiving, at the wireless device over a network, a remote action list version number that identifies a version of a remote action list without receiving the remote action list, the remote action list containing at least one or more instructions for the wireless device, the wireless device being a wireless mobile communications device;
   determining, at the wireless device, whether the remote action list version number is different from a local action list version number;
   sending, from the wireless device over the network, a request for the remote action list in response to determining the remote action list version number being different from the local action list version number;
   receiving, at the wireless device over the network, the remote action list containing the at least one or more instructions; and
   executing each instruction of the at least one or more instructions contained in the remote action list.

2. The method of claim 1 further comprising:
   sending, over the network, a request for the remote action list version number, the remote action list version number associated with the remote action list containing the at least one or more instructions for the wireless device.

3. The method of claim 1 further comprising:
   replacing the local action list version number with the remote action list version number.

4. The method of claim 1, wherein the remote action list version number and the local action list version number are each used to designate multiple application version numbers.

5. The method of claim 4, wherein if any of the application version numbers are different, the determining whether the remote action list version number is different from the local action list version number includes determining the remote action list version number being different from the local action list version number.

6. A method of handling instructions for a wireless device, comprising:
   storing, remote from the wireless device, a remote action list containing at least one or more instructions associated with the wireless device, the remote action list having a version identified by a remote action list version number, the wireless device being a wireless mobile communications device;
   sending, over a network, the remote action list version number without sending the remote action list;
   receiving, from the wireless device over the network, a request for the remote action list, the request for the remote action list generated in response to determining the remote action list version number being different from an action list version number stored at the wireless device; and
   sending, to the wireless device over the network, the remote action list containing the at least one or more instructions in response to determining the remote action list version number being different from a local action list version,
   wherein each instruction of the one or more instructions contained in the remote action list is configured to be executed on the wireless device.

7. The method of claim 6 further comprising:
   receiving, over the network, the request for the remote action list version number associated with the remote action list.

8. A method of handling instructions for a wireless device, comprising:
   storing, remote from the wireless device, a remote action list containing at least one or more instructions associated with the wireless device, the remote action list having an associated remote action list version number that identifies a version of the remote action list, the wireless device being a wireless mobile communications device;
   sending from the wireless device, over a network, a request for the remote action list version number associated with the remote action list;
   receiving at a server, over the network, the request for the remote action list version number associated with the remote action list;
   sending from the server, over the network, the remote action list version number without sending the remote action list;
   receiving at the wireless device, over the network, the remote action list version number;
   determining at the wireless device whether the remote action list version number is different from a local action list version number;
   sending from the wireless device, over the network, a request for the remote action list in response to determining the remote action list version number being different from the local action list version number;
   receiving at the server, over the network, the request for the remote action list;
   sending from the server, over the network, the remote action list containing the at least one or more instructions in response to determining the remote action list version number being different from the local action list version number;
   receiving at the wireless device, over the network, the remote action list containing the at least one or more instructions;
   executing, at the wireless device, each instruction of the at least one or more instructions contained in the remote action list; and
   replacing, at the wireless device, the local action list version number with the remote action list version number.

9. A method of handling instructions for a wireless device, comprising:
   maintaining an action list associated with at least one wireless device group, the action list containing at least one or more instructions for the wireless device, the wireless device being a wireless mobile communications device, the at least one wireless device group capable of having a plurality of wireless devices as members;
   generating a remote action list containing at least one or more instructions for a particular wireless device by identifying the at least one wireless device group for which the wireless device is a member and by aggregating action lists associated with the at least one wireless device group;
   generating a remote action list version number that identifies a version of the remote action list;
   sending, to the wireless device over a network, the remote action list version number without sending the remote action list, wherein the remote action list version number is used by the wireless device to determine whether the remote action list version number is different from a local action list version number;
   receiving, from the wireless device over the network, a request for the remote action list, the request for the remote action list generated in response to determining the remote action list version number being different from an action list version number stored at the wireless device; and sending, to the wireless device over the network, the remote action list containing the at least one or more instructions in response to determining the remote action list version number being different from the local action list version, wherein each instruction of the at least one or more instructions contained in the remote action list is configured to be executed on the particular wireless device.

10. The method of claim 9 further comprising:
receiving, over the network, a request for the remote action list version number associated with the remote action list.

11. A wireless device capable of handling instructions, comprising:
logic configured to receive, at the wireless device over a network, a remote action list version number that identifies a version of a remote action list without receiving the remote action list, the remote action list containing at least one or more instructions for the wireless device, the wireless device being a wireless mobile communications device;
logic configured to determine, at the wireless device, whether the remote action list version number is different from a local action list version number;
logic configured to send, from the wireless device over the network, a request for the remote action list in response to determining the remote action list version number being different from the local action list version number;
logic configured to receive, at the wireless device over the network, the remote action list containing the at least one or more instructions; and
logic configured to execute each instruction of the at least one or more instructions contained in the remote action list.

12. The wireless device of claim 11 further comprising:
logic configured to send, over the network, a request for the remote action list version number, the remote action list version number associated with the remote action list containing the at least one or more instructions for the wireless device.

13. The wireless device of claim 11 further comprising:
logic configured to replace the local action list version number with the remote action list version number.

14. A server for handling instructions for a wireless device, comprising:
logic configured to store, remote from the wireless device, a remote action list containing at least one or more instructions associated with the wireless device, the remote action list having a version identified by a remote action list version number, the wireless device being a wireless mobile communications device;
logic configured to send, over a network, the remote action list version number without sending the remote action list;
logic configured to receive, from the wireless device over the network, a request for the remote action list, the request for the remote action list generated in response to determining the remote action list version number being different from an action list version number stored at the wireless device; and
logic configured to send, to the wireless device over the network, the remote action list containing the at least one or more instructions in response to determining the remote action list version number being different from a local action list version, wherein each instruction of the at least one or more instructions is configured to be executed on the wireless device.

15. The server of claim 14 further comprising:
logic configured to receive, over the network, a request for the remote action list version number associated with the remote action list.

16. A system for handling instructions for a wireless device, comprising:
a server, including:
logic configured to store, remote from the wireless device, a remote action list containing at least one or more instructions associated with the wireless device, the remote action list having an associated remote action list version number that identifies a version of the remote action list;
logic configured to receive, over a network, a request for the associated remote action list version number associated with the remote action list;
logic configured to send, over the network, the associated remote action list version number without sending the remote action list;
logic configured to receive, over the network, a request for the remote action list;
logic configured to send, over the network, the remote action list containing the at least one or more instructions in response to determining the associated remote action list version number being different from a local action list version number; and
the wireless device corresponding to a wireless mobile communications device, including:
logic configured to send, over the network, the request for the associated remote action list version number associated with the remote action list;
logic configured to receive, over the network, the associated remote action list version number;
logic configured to determine whether the associated remote action list version number is different from the local action list version number;
logic configured to send, over the network, the request for the remote action list in response to determining the associated remote action list version number being different from the local action list version number;
logic configured to receive, over the network, the remote action list containing the at least one or more instructions;
logic configured to execute each instruction of the at least one or more instructions contained in the remote action list; and
logic configured to replace the local action list version number with the associated remote action list version number.

17. A server for handling instructions for a wireless device, comprising:
logic configured to maintain an action list associated with at least one wireless device group, the action list containing at least one or more instructions for the wireless device, the wireless device being a wireless mobile communications device, the wireless device group capable of having a plurality of wireless devices as members;
logic configured to generate a remote action list containing at least one or more instructions for a particular wireless device by identifying at least one wireless device group for which the wireless device is a member and by aggregating action lists associated with the at least one wireless device group;

logic configured to generate a remote action list version number that identifies a version of the remote action list;

logic configured to send, to the wireless device over a network, the remote action list version number without sending the remote action list, wherein the remote action list version number is used by the wireless device to determine whether the remote action list version number is different from a local action list version number;

logic configured to receive, from the wireless device over the network, a request for the remote action list, the request for the remote action list generated in response to determining the remote action list version number being different from an action list version number stored at the wireless device; and logic configured to send, to the wireless device over the network, the remote action list containing the at least one or more instructions in response to determining the remote action list version number being different from the local action list version, the remote action list containing the at least one or more instructions being sent, wherein each instruction of the at least one or more instructions is configured to be executed on the particular wireless device.

18. The server of claim 17 further comprising:

logic configured to receive, over the network, a request for the remote action list version number associated with the remote action list.

19. A non-transitory computer-readable medium comprising instructions, which, when executed by a machine, causes the machine to perform operations, the instructions comprising:

at least one instruction operable to receive, at the wireless device over a network, a remote action list version number that identifies a version of a remote action list without receiving the remote action list, the remote action list containing at least one or more instructions for the wireless device, the wireless device being a wireless mobile communications device;

at least one instruction operable to determine whether the remote action list version number is different from a local action list version number;

at least one instruction operable to send, from the wireless device over the network, a request for the remote action list in response to determining the remote action list version number is different from the local action list version number;

at least one instruction operable to receive, at the wireless device over the network, the remote action list containing the at least one or more instructions; and at least one instruction operable to execute each instruction of the at least one or more instructions contained in the remote action list.

20. The non-transitory computer-readable medium of claim 19 further comprising:

at least one instruction operable to send, over the network, a request for the remote action list version number, the remote action list version number associated with the remote action list containing the at least one or more instructions for the wireless device.

21. The non-transitory computer-readable medium of claim 19 further comprising:

at least one instruction operable to replace the local action list version number with the remote action list version number.

22. A non-transitory computer-readable medium comprising instructions, which, when executed by a machine, causes the machine to perform operations, the instructions comprising:

at least one instruction operable to store, remote from a wireless device, a remote action list containing at least one or more instructions associated with the wireless device, the remote action list having an associated remote action list version number that identifies a version of the remote action list, the wireless device being a wireless mobile communications device;

at least one instruction operable to send, over a network, the associated remote action list version number without sending the remote action list;

at least one instruction operable to receive, from the wireless device over the network, a request for the remote action list, the request for the remote action list generated in response to determining the associated remote action list version number being different from an action list version number stored at the wireless device; and at least one instruction operable to send, to the wireless device over the network, the remote action list containing the at least one or more instructions in response to determining the associated remote action list version number being different from a local action list version, wherein each instruction of the at least one or more instructions contained in the remote action list is configured to be executed on the wireless device.

23. The non-transitory computer-readable medium of claim 22 further comprising:

at least one instruction operable to receive, over the network, the request for the associated remote action list version number associated with the remote action list.

24. A non-transitory computer-readable medium comprising instructions, which, when executed by a machine, causes the machine to perform operations, the instructions comprising:

at least one instruction operable to maintain an action list associated with at least one wireless device group, the action list containing at least one or more instructions for the wireless device, the wireless device being a wireless mobile communications device, the at least one wireless device group capable of having a plurality of wireless devices as members;

at least one instruction operable to generate a remote action list containing at least one or more instructions for a particular wireless device by identifying at least one wireless device group for which the wireless device is a member and by aggregating the action lists associated with the at least one wireless device group;

at least one instruction operable to generate a remote action list version number that identifies a version of the remote action list;

at least one instruction operable to send, to the wireless device over a network, the remote action list version number without sending the remote action list, wherein the remote action list version number is used by the wireless device to determine whether the remote action list version number is different from a local action list version number;

at least one instruction operable to receive, from the wireless device over the network, a request for the remote action list, the request for the remote action list generated in response to determining the remote action list version number being different from an action list version number stored at the wireless device; and at least one instruction operable to send, to the wireless device over the network, the remote action list in response to determining the remote action list version number is different from the local action list version, wherein each instruction of the at least one or more instructions is configured to be executed on the particular wireless device.

25. The non-transitory computer-readable medium of claim 24 further comprising:

at least one instruction operable to receive, over the network, a request for the remote action list version number associated with the remote action list.

26. A wireless device capable of handling instructions, comprising:

means for receiving, at the wireless device over a network, a remote action list version number that identifies a version of a remote action list without receiving the remote action list, the remote action list containing at least one or more instructions for the wireless device, the wireless device being a wireless mobile communications device;

means for determining, at the wireless device, whether the remote action list version number is different from a local action list version number;

means for sending, from the wireless device over the network, a request for the remote action list containing the at least one or more instructions in response to determining the remote action list version number is different from the local action list version number;

means for receiving, at the wireless device over the network, the remote action list containing the at least one or more instructions; and means for executing the at least one or more instructions contained in the remote action list.

27. The wireless device of claim 26 further comprising:

means for sending, over the network, a request for the remote action list version number, the remote action list version number associated with the remote action list containing the at least one or more instructions for the wireless device.

28. The wireless device of claim 26 further comprising:

means for replacing the local action list version number with the remote action list version number.

29. A server for handling instructions for a wireless device, comprising:

means for storing, remote from the wireless device, a remote action list containing at least one or more instructions associated with the wireless device, the remote action list having a version number that is identified by a remote action list version number, the wireless device being a wireless mobile communications device;

means for sending, over a network, the remote action list version number without sending the remote action list;

means for receiving, from the wireless device over the network, a request for the remote action list, the request for the remote action list generated in response to determining the remote action list version number being different from an action list version number stored at the wireless device; and means for sending, to the wireless device over the network, the remote action list containing the at least one or more instructions in response to determining the remote action list version number being different from a local action list version, wherein each instruction of the at least one or more instructions is configured to be executed on the wireless device.

30. The server of claim 29 further comprising:

means for receiving, over the network, a request for the remote action list version number associated with the remote action list.

31. A system for handling instructions for a wireless device, comprising:

a server, including:

means for storing, remote from the wireless device, a remote action list containing at least one or more instructions associated with the wireless device, the remote action list having a version number identified by a remote action list version number;

means for receiving, over the network, a request for the remote action list version number associated with the remote action list;

means for sending, over the network, the remote action list version number without sending the remote action list;

means for receiving, over the network, a request for the remote action list;

means for sending, over the network, the remote action list containing the at least one or more instructions in response to determining the remote action list version number being different from a local action list version number; and the wireless device corresponding to a wireless mobile communications, including:

means for sending, over the network, the request for the remote action list version number associated with the remote action list;

means for receiving, over the network, the remote action list version number without receiving the remote action list;

means for determining whether the remote action list version number is different from the local action list version number;

means for sending, over the network, the request for the remote action list in response to determining the remote action list version number being different from the local action list version number;

means for receiving, over the network the remote action list;

means for executing each instruction of the at least one or more instructions contained in the remote action list; and means for replacing the local action list version number with the remote action list version number.

32. A server for handling instructions for a wireless device, comprising:

means for maintaining an action list associated with at least one wireless device group, the action list containing at least one or more instructions for the wireless device, the wireless device being a wireless mobile communications device, the at least one wireless device group capable of having a plurality of wireless devices as members;

means for generating a remote action list containing at least one or more instructions for a particular wireless device by identifying the at least one wireless device group for which the wireless device is a member and by aggregating action lists associated with the at least one wireless device group;

means for generating a remote action list version number that identifies a version of the remote action list;

means for sending, to the wireless device over a network, the remote action list version number without sending the remote action list, wherein the remote action list version number is used by the wireless device to determine whether the remote action list version number is different from a local action list version number;

means for receiving, from the wireless device over the network, a request for the remote action list, the request for the remote action list generated in response to determining the remote action list version number being different from an action list version number stored at the wireless device; and means for sending, to the wireless device over the network, the remote action list containing the at least one or more instructions in response to determining the remote action list version number being different from the local action list version, wherein each instruction of the at least one or more instructions is configured to be executed by the particular wireless device.

33. The server of claim 32 further comprising:

means for receiving, over the network, a request for the remote action list version number associated with the remote action list.

* * * * *